June 22, 1937. J. H. ROBERTS 2,084,746
STRAIGHTENING MACHINE FOR LONG STOCK
Filed Sept. 25, 1930 12 Sheets-Sheet 1
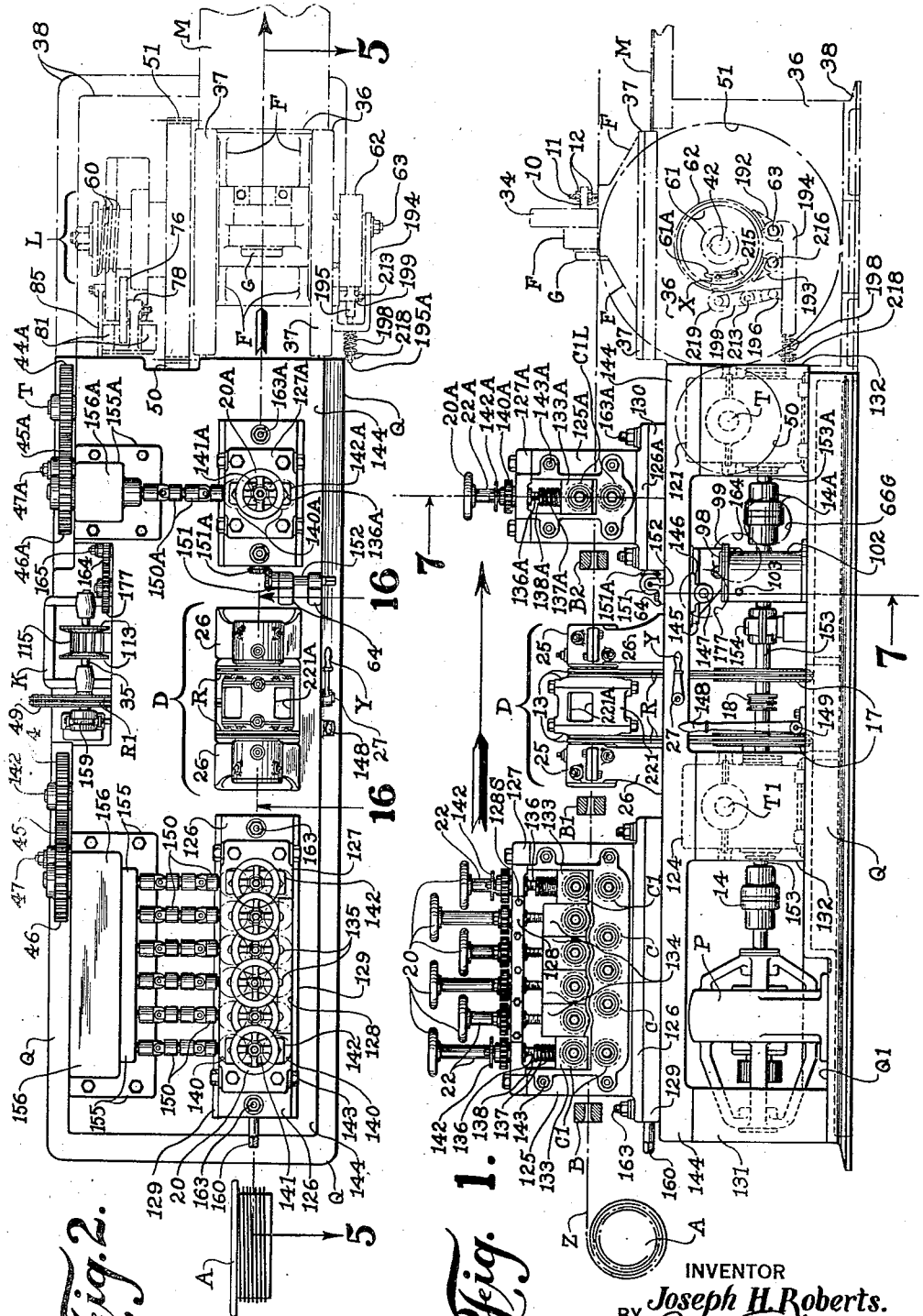
INVENTOR
Joseph H. Roberts.
BY
Philip Farnsworth
ATTORNEY

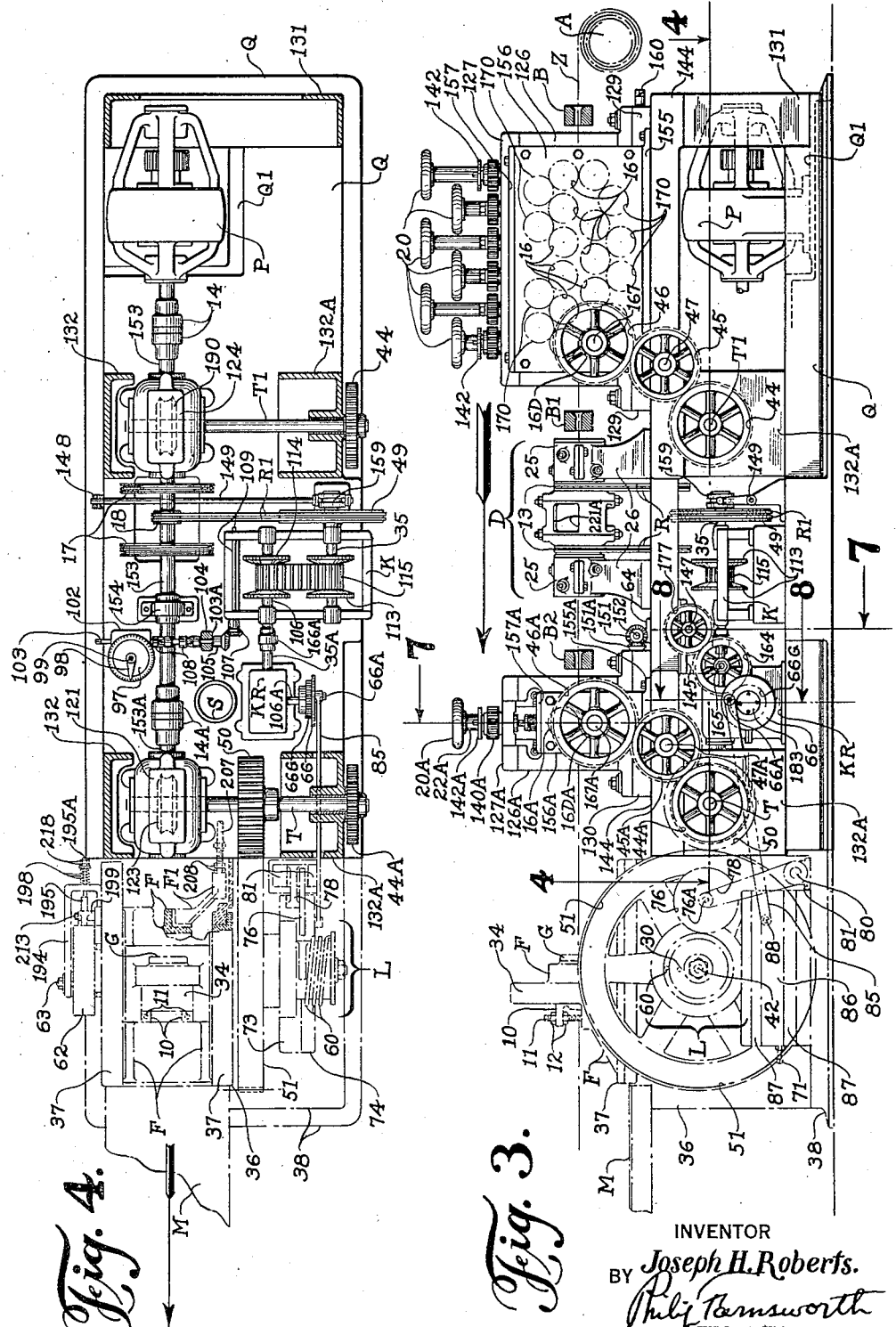

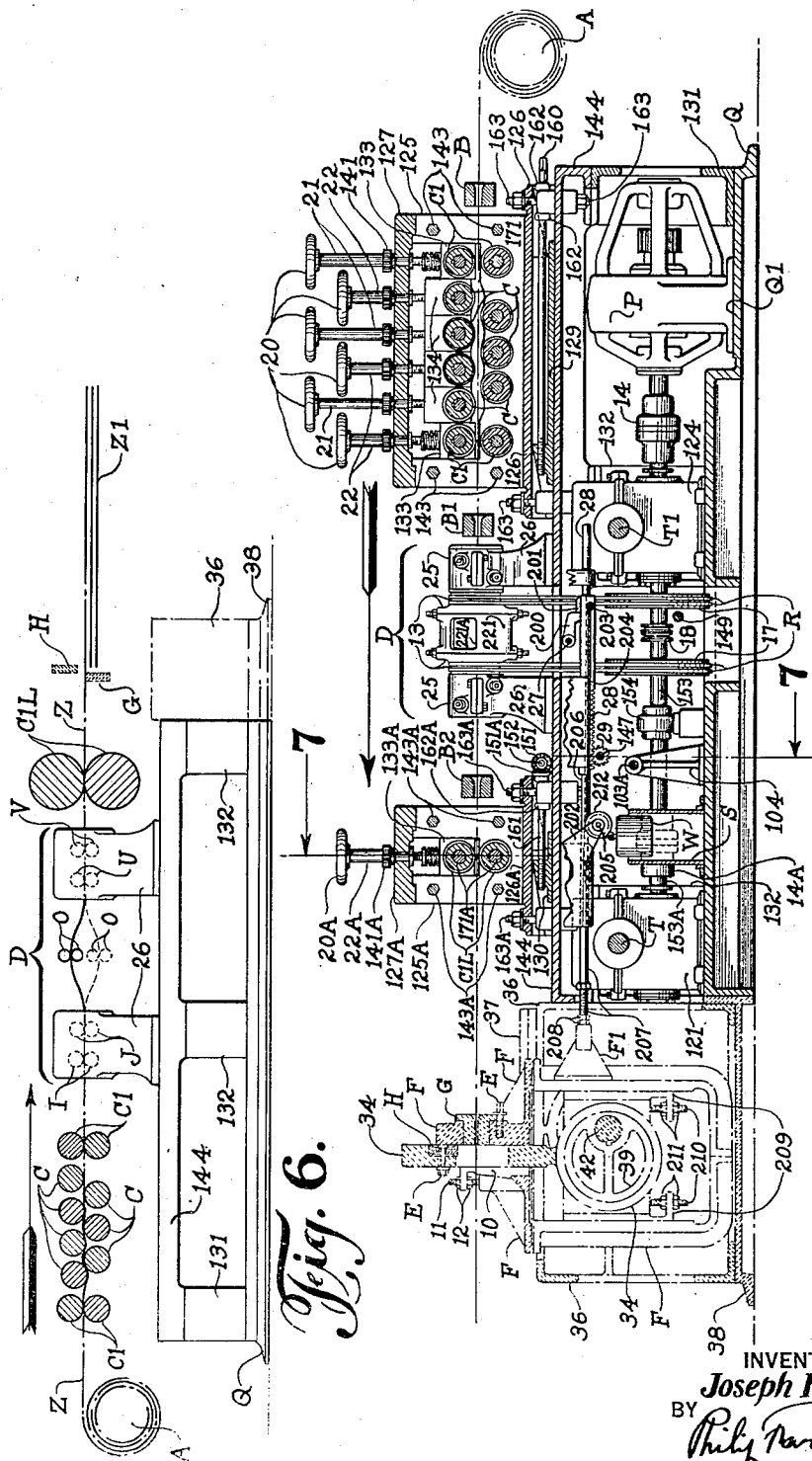

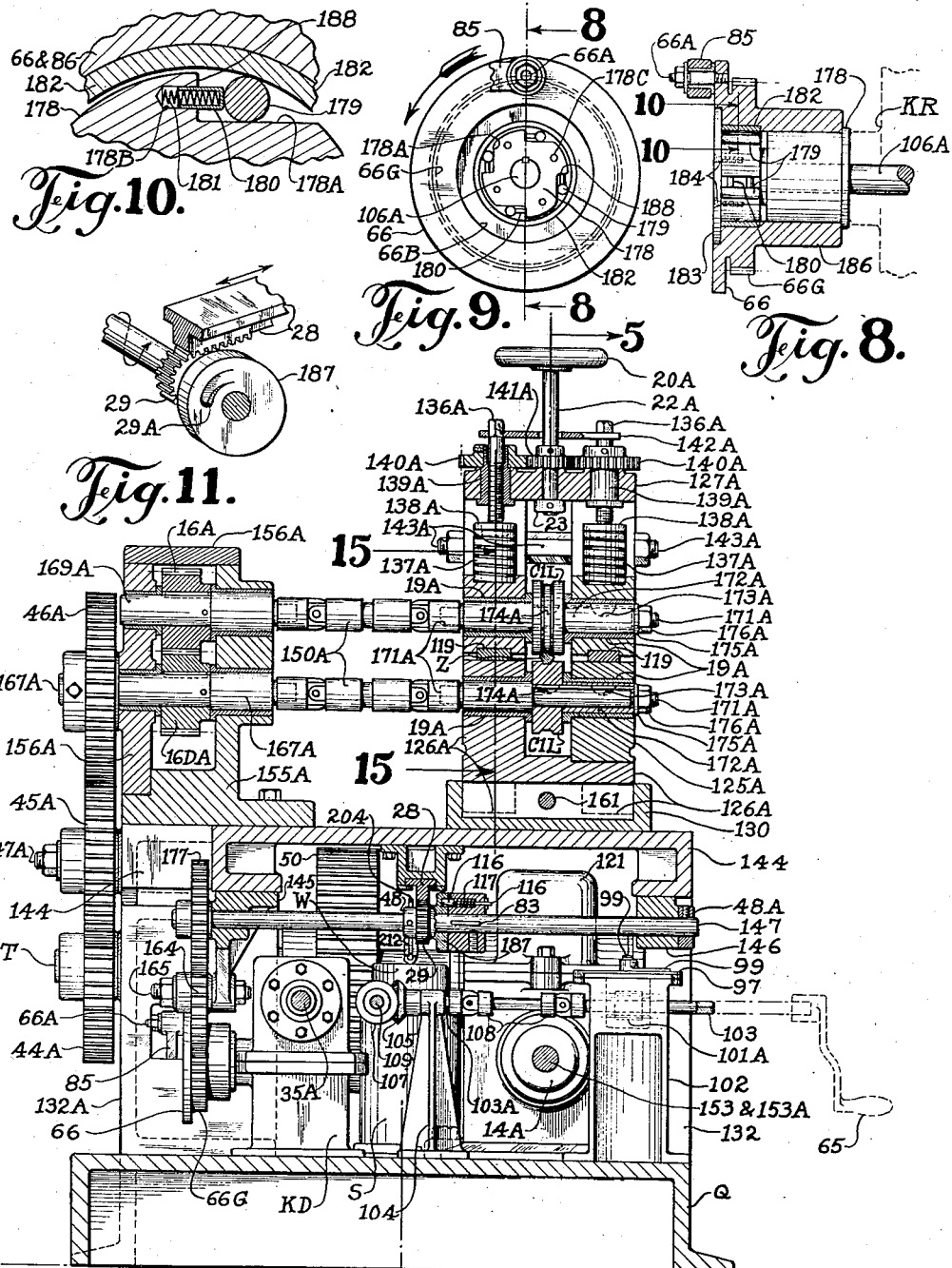

June 22, 1937. J. H. ROBERTS 2,084,746
STRAIGHTENING MACHINE FOR LONG STOCK
Filed Sept. 25, 1930 12 Sheets-Sheet 5
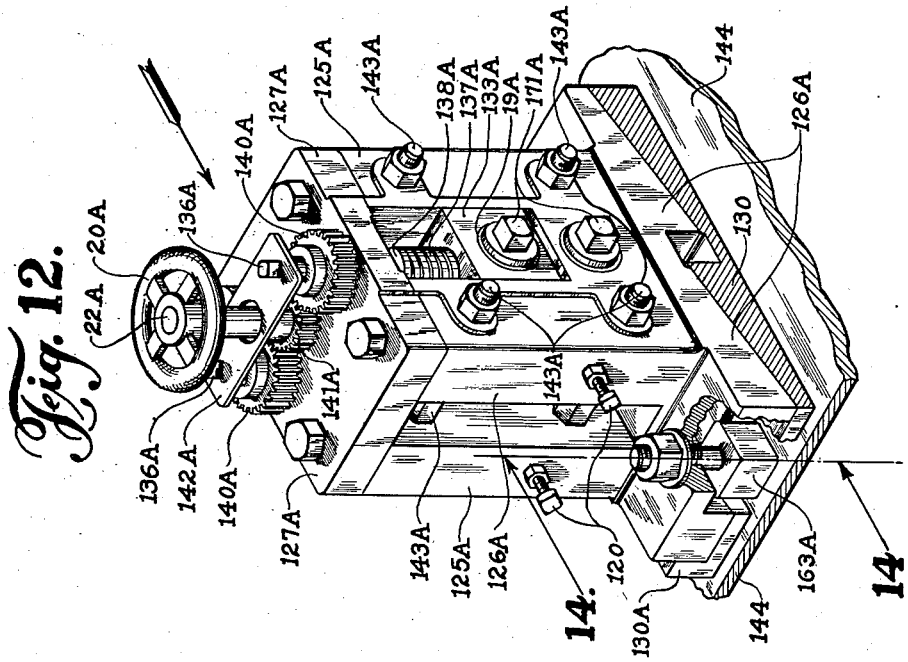
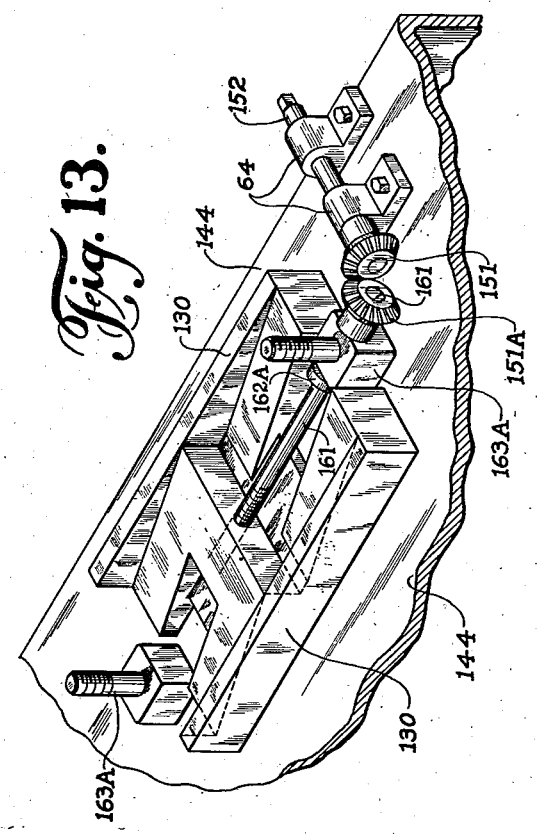
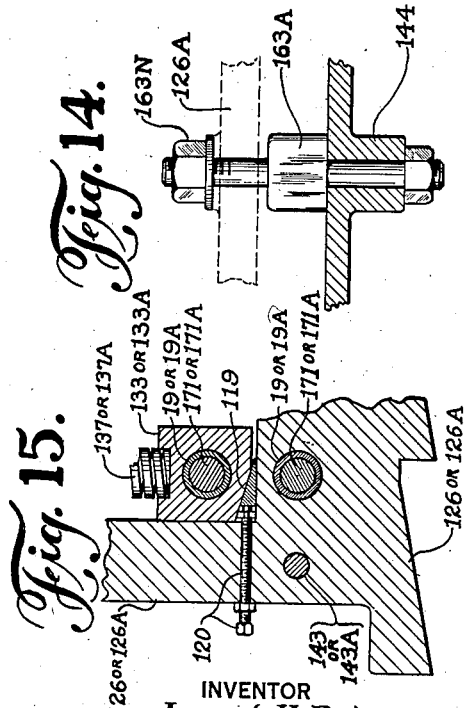
INVENTOR
Joseph H. Roberts.
BY
ATTORNEY

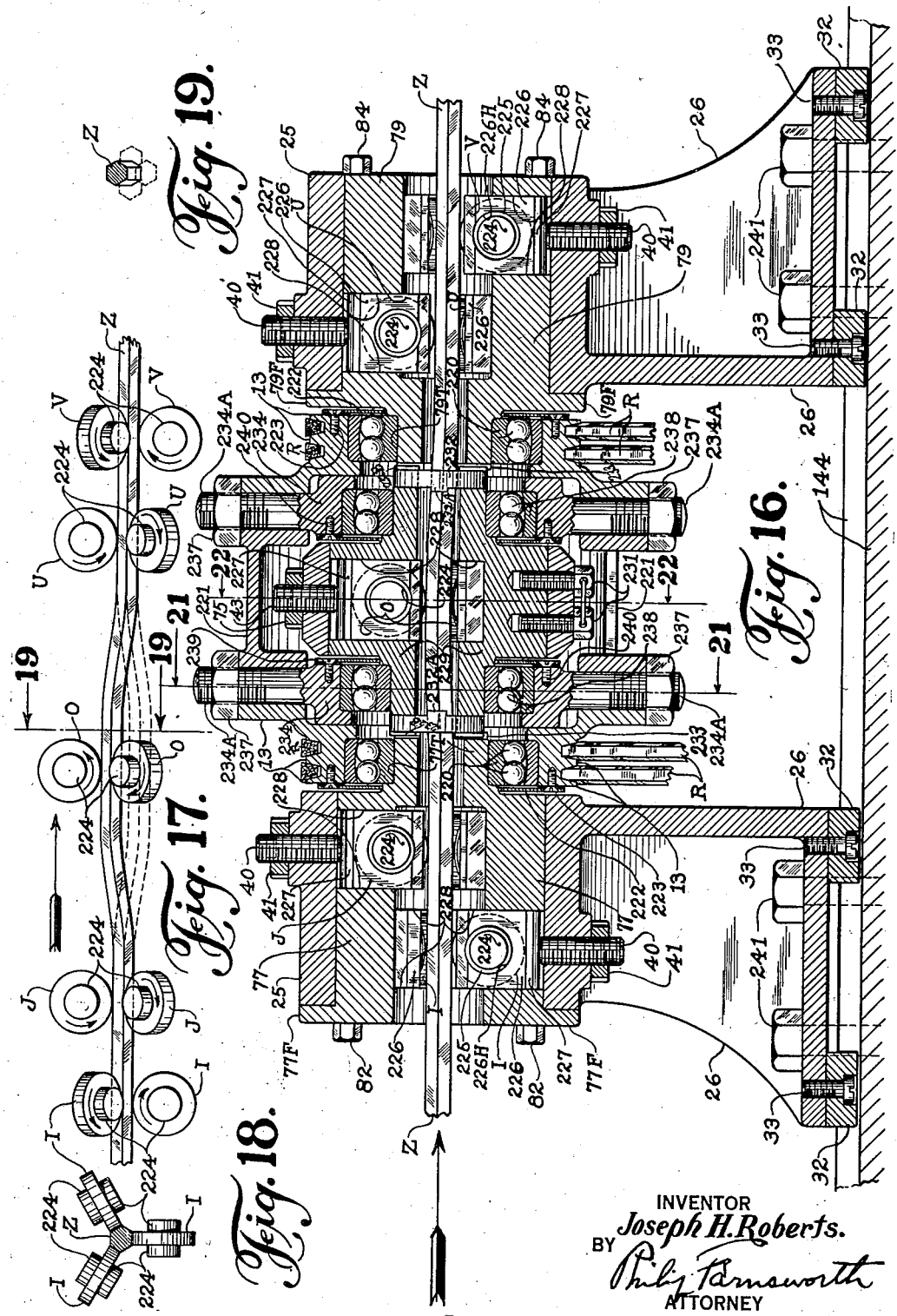

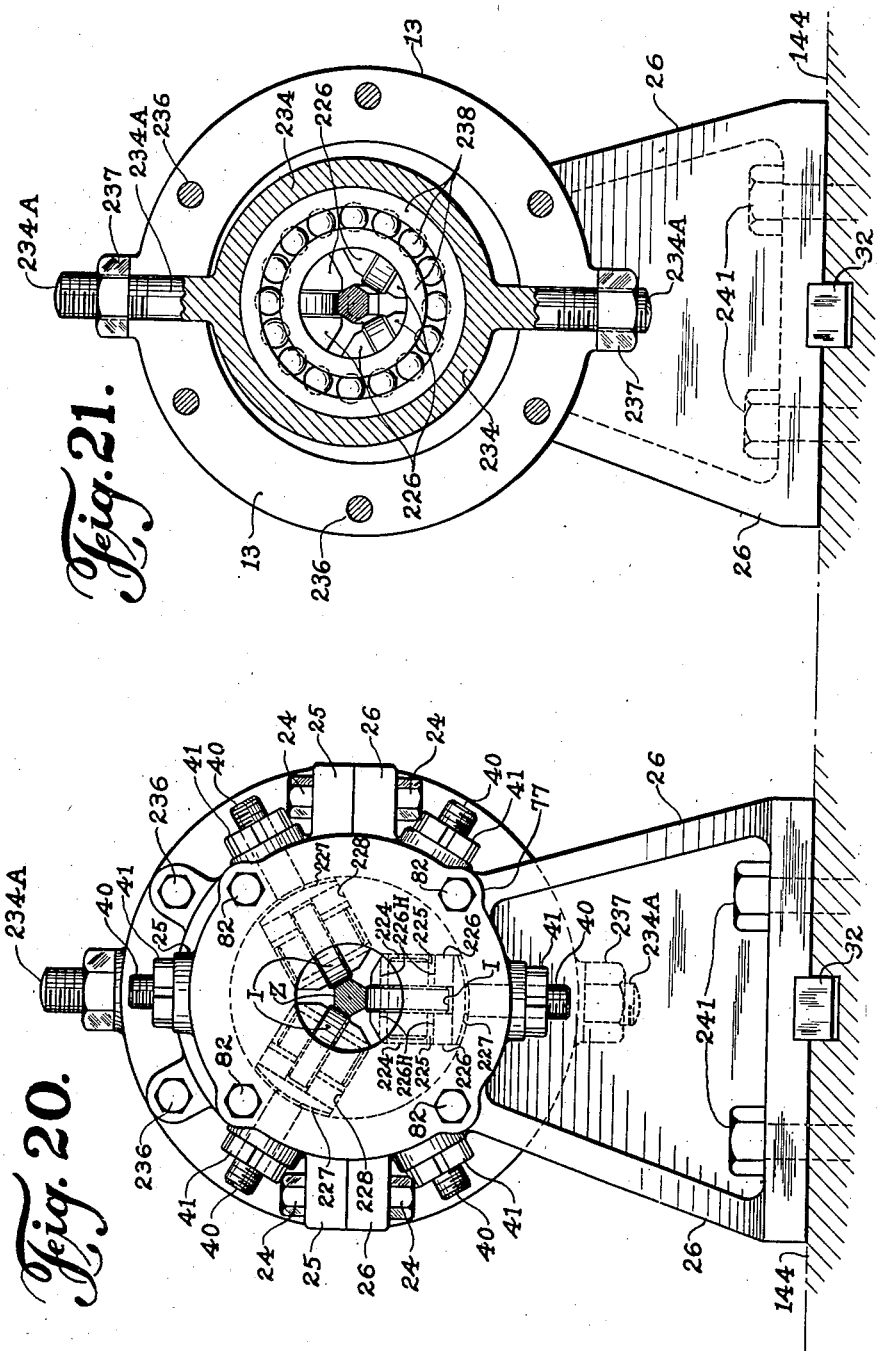

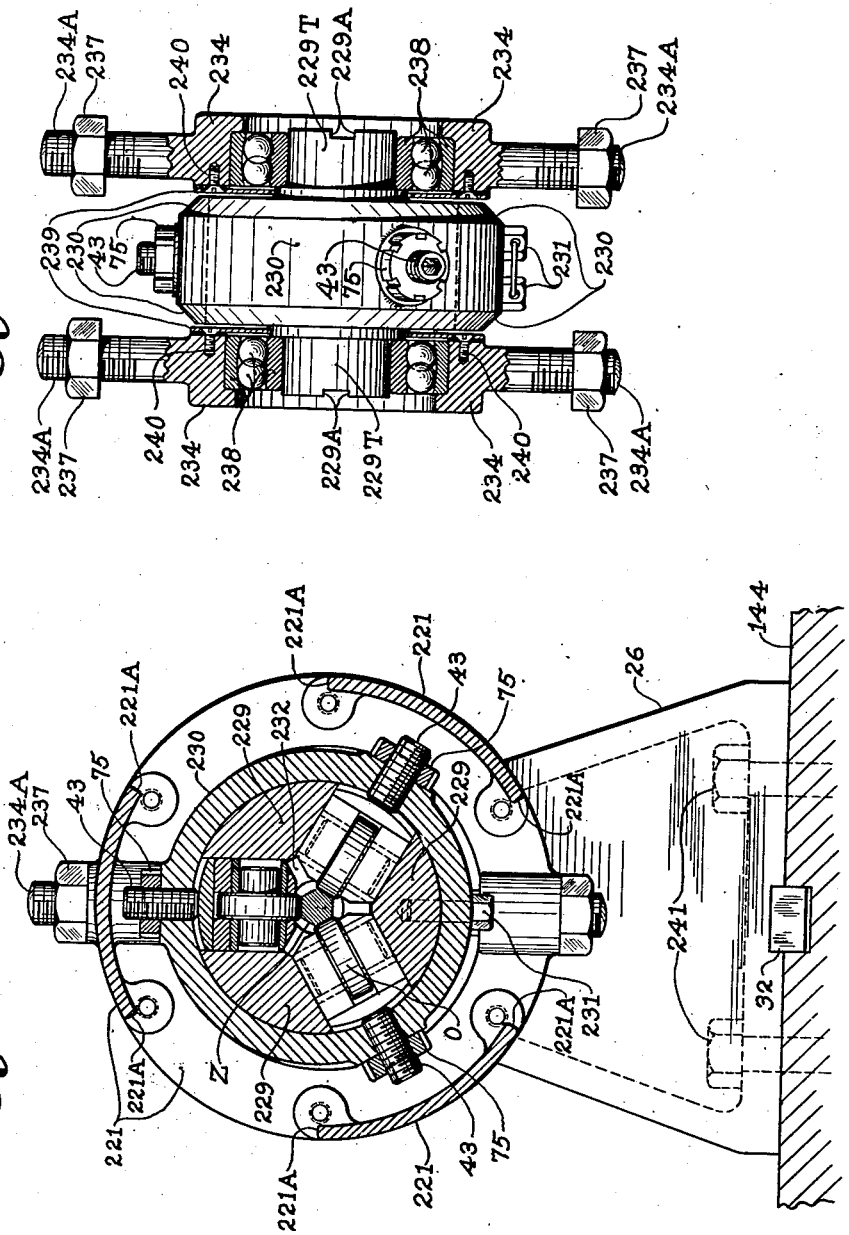

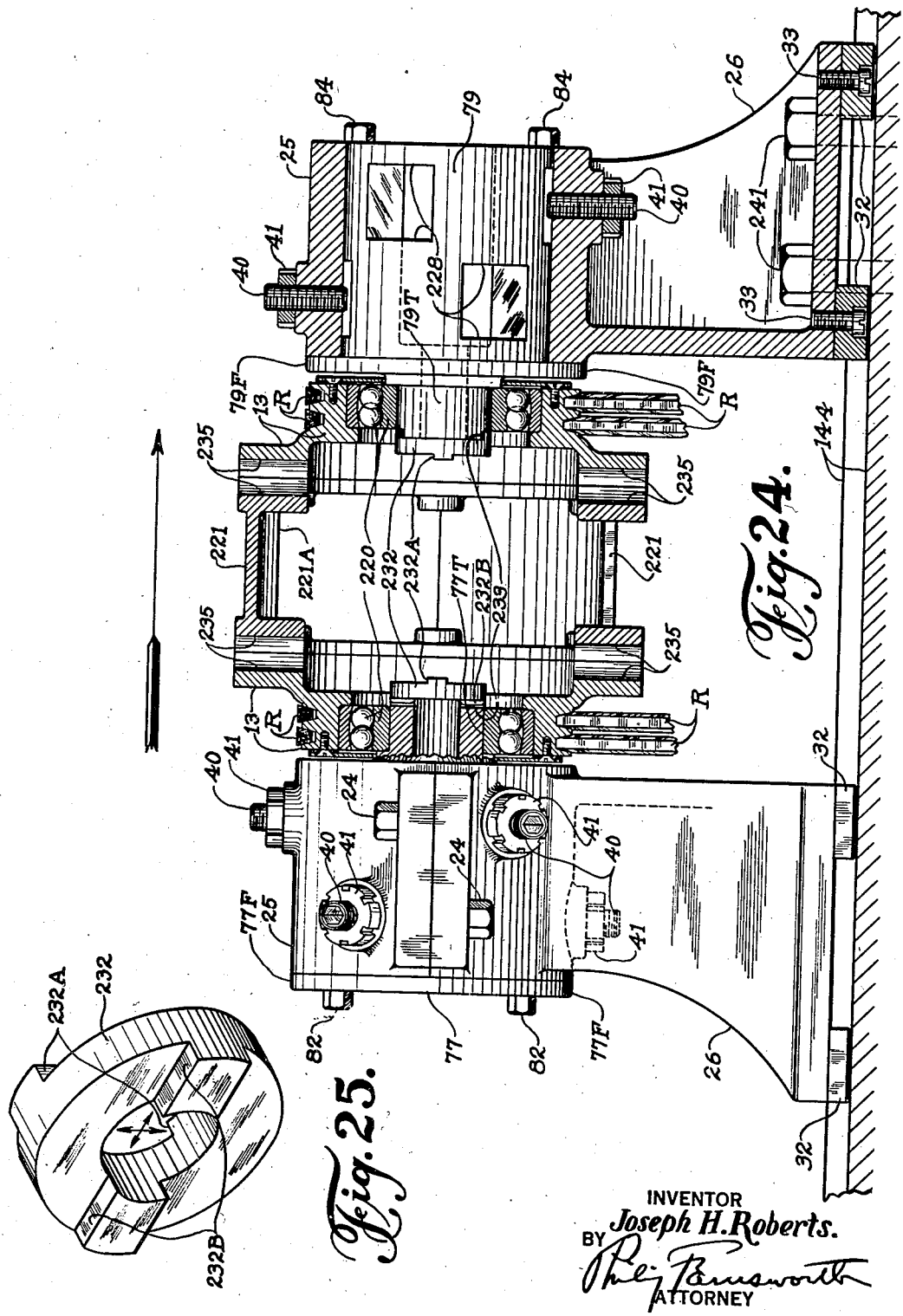

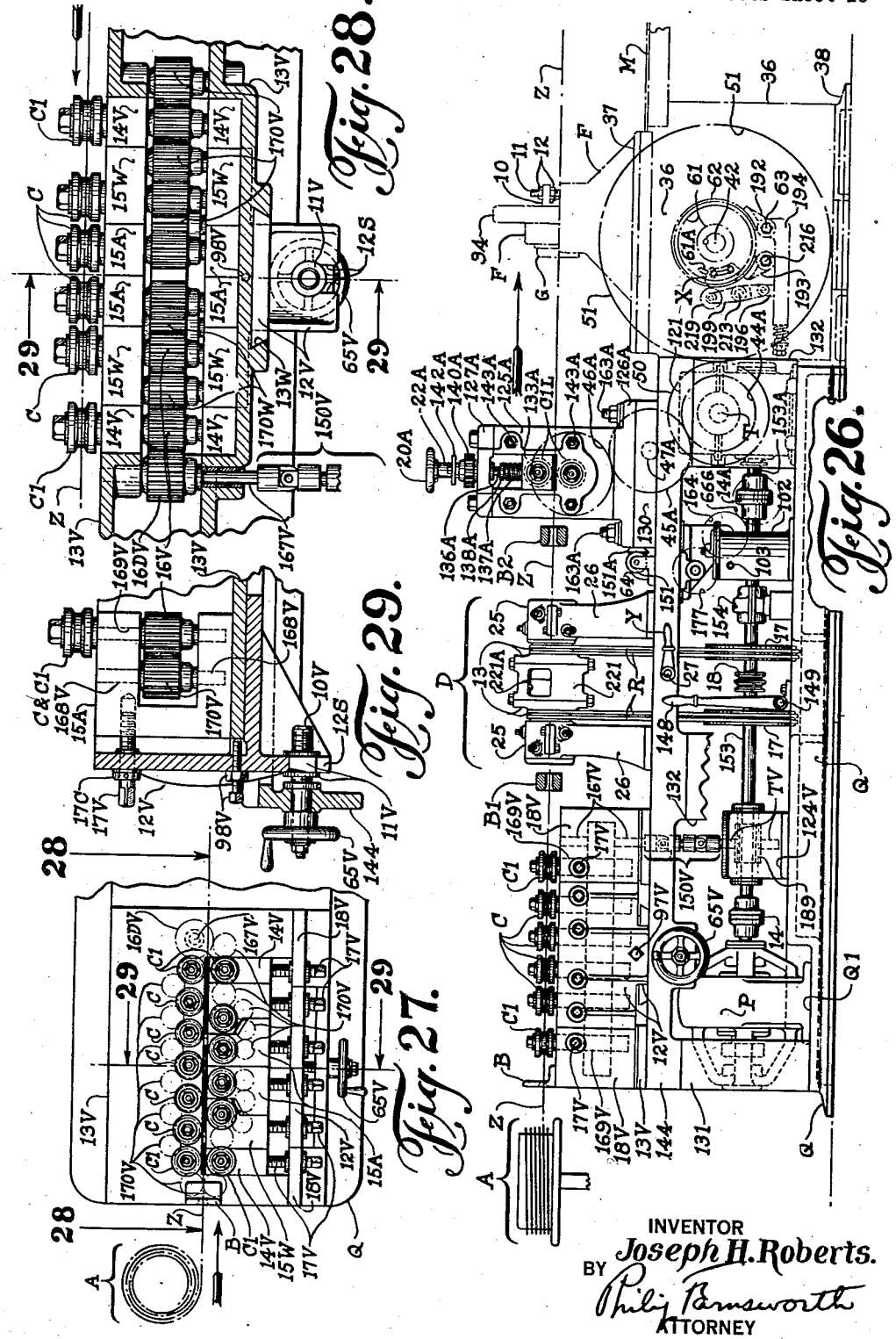

June 22, 1937.  J. H. ROBERTS  2,084,746
STRAIGHTENING MACHINE FOR LONG STOCK
Filed Sept. 25, 1930  12 Sheets-Sheet 11
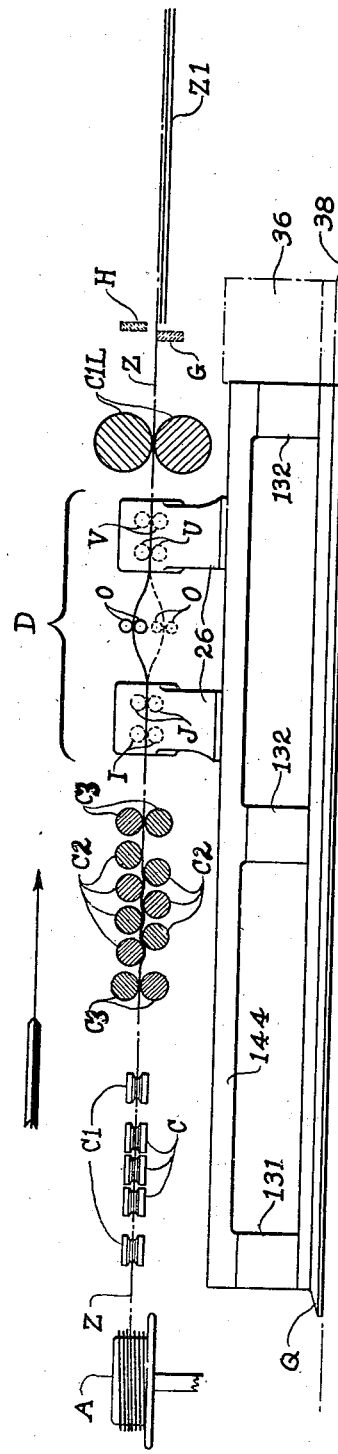
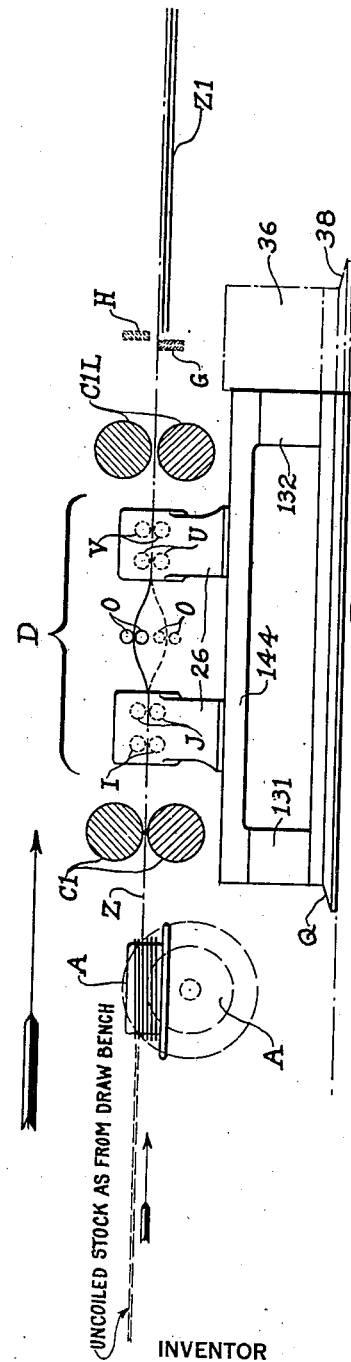
INVENTOR
BY Joseph H. Roberts.
ATTORNEY June 22, 1937.  J. H. ROBERTS  2,084,746
STRAIGHTENING MACHINE FOR LONG STOCK
Filed Sept. 25, 1930   12 Sheets-Sheet 12
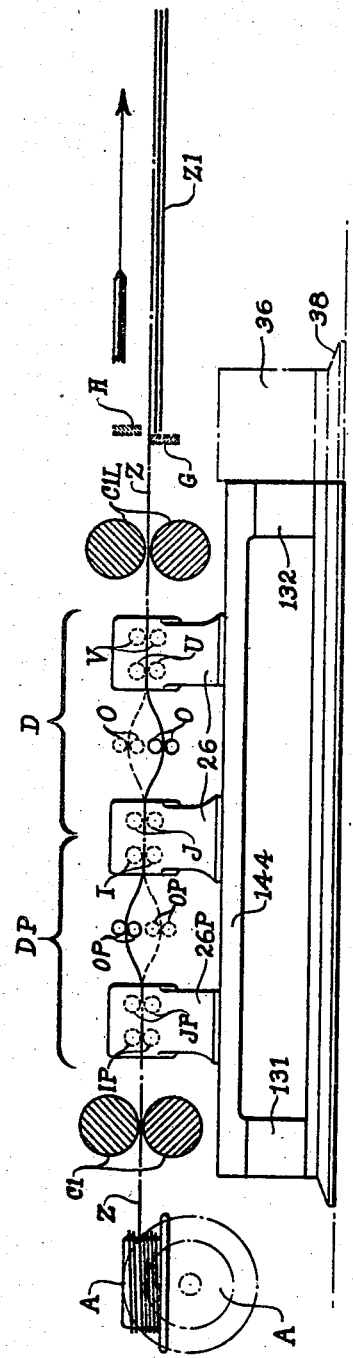
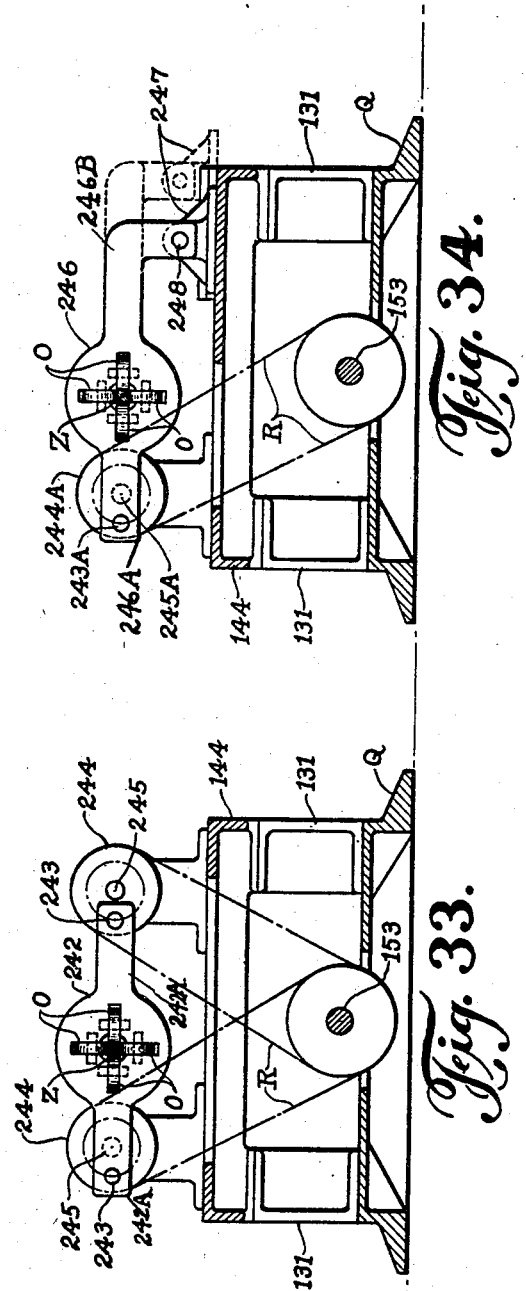
INVENTOR
BY Joseph H. Roberts.
ATTORNEY Patented June 22, 1937

2,084,746

UNITED STATES PATENT OFFICE 2,084,746

STRAIGHTENING MACHINE FOR LONG STOCK

Joseph H. Roberts, Waterbury, Conn., assignor to The F. B. Shuster Company, New Haven, Conn., a corporation Application September 25, 1930, Serial No. 484,319

6 Claims. (Cl. 140—147)

This invention relates to improvements in straightening machines for steel wire or rod stock (rod-like stock) of much greater length than breadth or thickness including more or less thick very long metal rod stock whether of polygonal or round cross-section as well as narrow rod-like strips of very long steel; the invention relating more particularly to my machine of a type including preliminary straightening by staggered spaced rolls followed with finished straightening by the rotary method hereof of multiflexing the stock; said initial or preliminary roll-straightening means incidentally cooperating to feed the stock as from a rod in coiled condition thru and possibly beyond or permissively to any desired fabricating mechanism (such as a shear) which may be set in series or line with the straightening elements to cooperate with such elements; and the invention relating to structure and other features in combination which cooperate to effect the object of insuring accurate straightening of any such rod-like stock. The rods may be small as a quarter inch diameter or less or thicker within the limits of strength and power of a given design of the machine hereof.

An additional object of the invention is an efficient and reliable and accurately operating machine of the above general class or type, which shall be as simple and of as low cost as may be considering the method involved, and which will operate at a high production rate.

The invention is disclosed in the accompanying drawings of two exemplary machines respectively shown in Figs. 1–6, and in Figs. 26–29, Fig. 30, Fig. 31, and Fig. 32; Figs. 6, 30–32 being diagrams of the operations and novelty variations of both machines each showing relative positions of rest of the two fabricating tools (G—H) of a cooperating fabricator; and Figs. 33, 34 being modifications, in certain respects, of the portion of the machine shown in Figs. 16–25.

The exemplary disclosures are in the form of machines working for example on very long steel rods of greater or less thickness. Said rods as they come from the mill to the machine hereof being frequently hundreds of feet long in the form of a coil; altho if drawn to size on a draw-bench the rods would have much shorter unfabricated lengths such as in the order of eighty to one hundred feet long more or less. That is, the stock Z before it is processed by the present invention may be formed in several ways, i. e., (1) by finish-to-size rolling on a rod-mill (i. e. a type of rolling mill) with a resulting stock-coil containing hundreds of continuous feet of stock; or (2) the rod stock may be drawn by a continuous-acting rotary drawing-block (i. e., wire-drawing machine) and again would be in coil form of great stock length of hundreds of feet; but (3) when the stock is too heavy for coiling (i. e. in the order of large diameters above ⅝ inch toward the order of one inch) it is drawn horizontally in lengths up to 80 to 100 feet on a draw-bench which is equipped with a stationary size-forming die and a pair of traveling tongs; the stock previously being more or less swaged-down on its van end so as to pass thru the stationary size-forming die sufficiently to allow gripping by the traveling tongs; and such tongs (after gripping the swaged end of the stock protruding thru the die) are automatically hooked to a traveling chain which draws the tongs with the gripped stock horizontally the length of the "carriage-run" of the tongs to a disconnecting position thereon where the tongs are automatically freed from the traveling chain. Draw benches as employed in said third method usually are not built for greater stock lengths than 80 to 100 feet as these machines take up at least twice the length of their drawn rod product and usually several feet more than this "two to one" length-factor; i. e. such a draw-bench machine for drawing 100 foot stock would be of the order of 210 feet over-all length.

The feeding movement of the long stock is longitudinally of its length and always in the same direction but is shown as indicated by arrows from left to right in Figs. 1, 2, 6, 16, 17, 24, 26, 27, 30, 31 and 32. But the movement of the stock is shown from right to left in rear views, Figs. 3, 4, 5, 12 and 28.

Referring to the drawings—

Fig. 1 showing the first machine is a front elevation to the right of which is (shown in phantom) a cooperating stock fabricator;

Fig. 2 is a plan of Fig. 1;

Fig. 3 is an elevation taken from the rear of Fig. 1;

Fig. 4 is a sectional sub-plan view on line 4—4 of Fig. 3;

Fig. 5 is a longitudinal sectional elevation substantially on line 5—5 of Fig. 2;

Fig. 6 is a diagrammatic showing of the several cooperating elements of the exemplary machine of Figs. 1–5 including the whirling straightener D of Figs. 30 and 31 shown in detail in Figs. 16–25;

Fig. 7 is a transverse section on line 7—7 of Figs. 1, 3;

Fig. 8 is an enlarged detail transverse section on line 8—8 of Fig. 3;

Fig. 9 is a face-view of Fig. 8 from the left, but having the roll retaining member removed the better to expose other details of the one-directional clutch mechanism;

Fig. 10 is a fragmentary enlarged transverse section on line 10—10 of Fig. 8;

Fig. 11 is a detail perspective of the rack and pinion of the hand tripping mechanism;

Fig. 12 is an enlarged perspective showing the ensemble of the push-pull pinch-feed, roll unit partially broken away at bottom to show adjusting angles of wedge-plate;

Fig. 13 is an enlarged perspective showing of the wedge-plate construction with lead screw for adjusting the roll-stand units "en masse".

Fig. 14 is an enlarged sectional showing of the dowel-binding posts 163—163A on line 14—14 of Fig. 12;

Fig. 15 is an enlarged sectional showing of the feed-roll separating means on line 15—15 of Fig. 7;

Fig. 16 is an enlarged longitudinal sectional elevation of the rotary stock flier D of Figs. 6, 30 and 31, as on line 16—16 of Fig. 2;

Fig. 17 is a longitudinal diagrammatic view of the stock showing the relative positions of the several cooperative stock-flexing groups of rolls within the rotary flier acting thereon;

Fig. 18 is an end elevational view from the left of Fig. 17;

Fig. 19 is a transverse section of the stock shown in Fig. 17 on line 19—19;

Fig. 20 is an end elevational view from the left of Fig. 16;

Fig. 21 is a transverse section on line 21—21 of Fig. 16;

Fig. 22 is a transverse section on line 22—22 of Fig. 16 showing various multi-flexed positions of Z;

Fig. 23 is a detached view (relative Fig. 24) of the stock-flexing ensemble within the rotary flier unit showing in section the anti-friction mounting on this "ensemble" in the "off center" adjustment components;

Fig. 24 is a front elevational view of the rotary flier partially in section with the "ensemble" of Fig. 23 removed therefrom;

Fig. 25 is an enlarged perspective-detail of the coupling members which act to positively prevent the "stock-flexing" ensemble of Fig. 25 from turning on its axis within the rotary flier unit of Fig. 16, etc.;

Fig. 26 is a front elevation of a second exemplary machine like that of Fig. 1 with variation in the arrangements of the straightening elements and to the right of which is outlined a cooperating stock fabricator;

Fig. 27 is a partial plan of Fig. 26 showing the novelty arrangement of the preliminary straightening roll-stand ensemble thereof;

Fig. 28 is a longitudinal sectional elevation on line 28—28 of Fig. 27;

Fig. 29 is a transverse sectional elevation on lines 29—29 of Figs. 27-28;

Fig. 30 is a diagrammatic front elevation design analogous to the machines of Figs. 1, 26 with a re-arrangement combination of the straightening elements thereof;

Fig. 31 is a diagrammatic front elevation of a machine utilizing a simple novelty arrangement of the multi-flexing stock straightening elements;

Fig. 32 is a diagrammatic front elevation of a dual arrangement of the multi-flexing ensembles combined into a machine of straightening principles analogous to that of Figs. 1, 26;

Fig. 33 is a diagrammatic transverse sectional elevation thru a novelty design of the multi-flexing stock-straightening mechanism of Figs. 16-24; and Fig. 34 is a diagrammatic transverse sectional elevation thru a further novelty design of the multi-flexing stock-straightening mechanism of Figs. 16-24.

In each of the depicted cooperative arrangements of straightening elements Figs. 1-6, 26, 30-32, the generical rod-straightening methods are the same, wherein unstraightened rod-like stock, as from the mill is first preliminarily straightened (whether by vertical rolls, horizontal rolls, or by a preliminary straightening flier, such as DP of Fig. 32) and then multiflexed by a rotary-flier such as D, Figs. 1-6, to obtain the desired accurate finish-straightening results; however, in the simple arrangement outlined in Fig. 31, the preliminary straightening of rod-like stock may be assumed to have been incidentally performed in the preceding "drawing-to-size" operation on non-coiled stock (see stock Z indicated by horizontally dotted lines at left, Fig. 31) in the "draw-bench" as has been briefly referred to in the preamble of this specification.

The following is a brief index of the operations, left to right Figs. 1-2, the operator facing the front and the various controls. The heavy coil or roll of long steel rod-like stock Z from the mill, and desired to be straightened is raised from the floor to the dispensing position of reel A; the operator then proceeds to insert the van-end thru the guide B and into the initial pair of power-operated pinch-feed rolls C1, Figs. 1-2, whence it is power-fed continuously rightward, Figs. 1-2, as long as the machine is in operation, to the pairs of spaced and staggered feed-rolls C, Figs. 1, 3 and 5, thru pinch-rolls C1, Fig. 1, thru guide B1, thru the multi-flexing flier D, thru guide B2, thru auxiliary pull-push pinch-feed rolls C1L and possibly beyond to a cooperating fabricating mechanism shown phantomly at right, Figs. 1-2; this last mechanism however does not form a part of this present invention, altho such a fabricating mechanism may form an important link in a "chain of operations" necessary for producing straightened sub-lengths of stock Z of uniform linear dimensions such as set forth in my prior application for patent, Serial No. 365,528 filed May 23, 1929.

All of the foregoing mechanical-components (including an independent cooperative and adjacently located fabricating mechanism) operate in tune to straighten and feed the stock and to subsequently produce sub-portions Z1 of uniform length; and all but reel "A" are driven by a common driving means such as electric motor P. Fig. 1, by way of a series of inter-connected driving shafts (i. e. the worm-shafts 153—153A) of the commercial reduction-units 121 and 124; all of which are arranged parallel with the line of stock-feed and extending longitudinally of the machine.

The motor P is positioned on that depressed portion Q1 of the bed-plate Q setting within the general supporting structure of the machine and is power-connected end on end with the worm-shafts 153—153A, Figs. 1, 4 and 7 by the flexible couplings 14—14A; said worm-shaft 153 having an additional bearing support 154 Figs. 1, 4 and 5, on its long extended portion adjacently positioned to the flexible coupling 14A, Figs. 1, 4 and 5.

The power received from motor P is transferred from the driving worm-shafts 153—153A, Fig. 1, to the several operating components as follows:

(1) From the worm-shaft 153 to the ensemble of rolls C—C1, which are grouped in the preliminary stock straightening roll-stand (upper left, Fig. 1), the power drive is suitably reduced in revolutions per minute, by the worm 189 and the worm-gear 190 of the commercial worm-gear speed reduction unit 124, driving rolls C—C1 at an optimum rate of stock feed; said worm 189 being mounted on high-speed shaft 153; and worm-gear 190 on the low-speed shaft T1; both 189—190 being supported within the general housing of the unit 124 and shaft T1 being extended transversely rearward of the reduction unit 124, Fig. 1, to drive via spur gears 44, 45 and 46, Fig. 3, the gear-box ensemble which distributes rotative power by universal joints 150 to the rolls C—C1;

(2) From the shaft 153 to flier unit D by the multi-strand V-belts R from sheave pulleys 17—17 to pulley-members 13—13;

(3) From the worm-shaft 153 to the master K, and K's speed reducer KR, via multi-strand V-belt R1 driving from the sheave pulley 18 to pulley 49 on clutch 159; master-mechanism K—KR being provided in the exemplary machine only in conjunction with the possible use of an adjacent fabricating mechanism; and to this end there is provided the clutch 159 controlled by the operator from the front of the machine thru the control handle 148 and its connecting linkage including shaft 149 to clutch 159;

(4) From the worm-shaft 153 to 153's companionate worm-shaft 153A via the flexible coupling 14A; and (5) From the worm-shaft 153A to the pull-push pinch-feed rolls C1L via the speed-reduction worm and worm-gear components 122—123 of the reduction-unit 121 thru to the transverse worm-gear driven shaft T and the spur-gears 44A, 45A and 46A, Figs. 3-4 and by the connecting universal joints 150A.

Shaft T, incidentally, may support a pinion-gear 50, Fig. 4, to drive a fabricating mechanism as phantomly outlined at left, Figs. 3-4; and all being driven by motor P.

As to the speeds, motor P is preferably, but not necessarily, an adjustable speed D. C. motor of from 550 to 1650 R. P. M. and, as P is directly connected to shafts 153—153A by flexible couplings 14—14A, these shafts turn over thru the same range of revolutions per minute as does motor P.

The only "step-up" of speeds above the operating speeds of motor P exists between shaft 153 and the flier D; this "step-up" being provided for in the proportioning by the designer of the relative diameters of sheave-pulleys 17—17 on shaft 153 and the rotating members 13—13 of flier D driven by belts R; this step-up ratio of flier D's revolutions per minute being in an order of increased revolutions per minute of as 2, or 2½, is to one; this speed of flier D varying to suit the specific variations of stock to be operated upon according to the prior art thereof as selected by the machine builder.

The drives from motor P to all the other component units of the exemplary machine via shafts 153—153A being substantially reduced in revolutions per minute, as follows:

The reduction ratio, Figs. 1, 4, between the two worms 122, 189 and their respective worm-gears 123, 190 all of which are supported within the oil-tight casings of the two reduction units 121, 124, is as 1 is to 4⅝; and shafts T and T1 for driving rolls C, C1 and C1L, will thereby be theoretically rotated (according to the adjusted speed of motor P) from 113.8 to 341.4 R. P. M.

As the theoretical speed of shafts T and T1 as above stated varies from 113.8 to 341.4 R. P. M., a further speed reduction of as 2 is to 1 is provided in the proportioning of the gear-trains 44, 45, 46 and 44A, 45A, 46A so that thru gear-spindles 167, 169 and 167A, 169A, the rolls C, C1, C1L may all be in tune and theoretically rotated at from 56.9 to 170.7 R. P. M.; this is accomplished here by proportioning gears 44—44A, Fig. 3, to be small enough relative gears 46—46A, Fig. 3, as 8" diameter (gears 44—44A) is to 16" (gears 46—46A) pitch diameter; idler gears 45—45A being only of sufficient diameter, such as 10", to bridge the intervening space between gears 44—44A and gears 46, 46A; idler gears 45—45A being respectively supported on the studs 47—47A which are fixed to table member 144. The reason only such further speed reduction is preferably provided is as follows. Shafts T and T1 have speed ranges from a low of 113.8 R. P. M. to a high of three times this, i. e., 341.4 R. P. M.; but, as the grooved throat diameters of rolls C, C1, C1L govern the feed on the stock Z, it is necessary to make the additional speed reduction of these roll-spindles (59.9 to 170.7 R. P. M.) via gears 44—46 and 44A—46A, when standard gear-reduction unit 124 is employed. But the entire speed reduction here might be taken care of by a special design of unit 124 (which drives rolls C—C1) instead of employing 124 as a standard reduction ratio unit as here preferred; but with standard reduction unit 121 driving rolls C1L not all this proper speed reduction can be made in this way (i. e. by changing reduction ratio of 121 as above mentioned for unit 124) because shaft T must rotate at a sufficiently high rate to drive the bull-gear fly-wheel of the adjacent fabricating machine; hence the "two to one" reduction ratio is retained between gears 44A and 46A in order that shaft T will drive rolls C1L in tune with rolls C—C1.

This arrangement of gear-diameters in the gear-trains 44, 45, 46 and 44A, 45A, 46A decreases the speed of spindles 169—169A and of the rolls C, C1, C1L to a tuned order of rotation corresponding with the speed adjustment of motor P (i. e. theoretically 56.9 to 170.7 R. P. M.). Spindles 168 are dead and idler-gears 170 turn freely on them.

The ensemble of gears 16, 16D, 170 with spindles 167, 168, 169 are supported and enclosed by the gear-box housing 155, the side-plate 156 and cover-plate 157 in a manner analogous to that cross-sectioned showing in Fig. 7 (top left) of a like enclosure of the gears 16DA, 16A, with spindles 167A, 169A, supported by the small gear-box housing 155A, the side-plate 156A and the cover-plate 157A; the former ensemble distributing power, and driving to rolls C—C1, while the latter as in Fig. 7 drives to the rolls C1L.

Thus it is seen that stock Z is continuously unreeled from A and fed left to right Figs. 1, 6, thru the ensemble of rolls C1—C—C1 (or equal mechanism as in Fig. 32) for the rough or preliminary straightening, thru the rotary finish-straightener D to the pull-push pinch-feed rolls C1L and beyond to any subsequent coacting mechanism (such as a fabricator) positioned "in line" of the stock's feed.

The stock-reel "A" is preferably but need not be of a power-operated type as set forth in my prior application for Patent Serial No. 437,305 filed March 20, 1930, wherein the turn table of the reel which may in the exemplary machines support a coil of stock Z in either a horizontal or vertical plane, see Figs. 6, 30 is power raised and lowered from the floor by the operator's control of the stock-reel motor.

With the reel-head loaded with a stock-coil and raised to its dispensing position, the operator as outlined before loosens the bindings of the stock-roll and manually feeds the van end of the coiled stock thru the stationary guide B, Fig. 1; thence the van of the stock is power engaged by the first pair of constantly rotated pinch-feed rolls C1 feeding Z forward to right to the several straightening elements to the pull-push pinch-feed rolls C1L.

In the feeding thru the machine of stock Z by the roll-stand rolls C1, C, C1, left to right, Figs. 1, 6, prior to operation by the pinch-rolls C1L, the successive rolls C in each row are arranged to have a small horizontal spacing between them such as of the order of one-quarter inch. For example rolls C of 4¾ inch diameter for handling rods of ⅜ to ¾ inch hexagonal diameter, are centered 5 inches apart in the row to provide such quarter inch horizontal spacing between successive rolls. And, as shown, the rolls C in one row are staggered relative to the rolls C in the other row. This arrangement deforms and "breaks the back" of the coiled stock coming from off the reel A which is positioned with its axis parallel with the axes of the rolls so that the natural curvature of the coiled stock coincides with the curvature of the rolls so as to aid the flier D in producing the accurate finished straightening of stock Z and thus incidentally to aid in insuring uniformity of product, such as of the linear dimension of sub-lengths Z1, produced by later fabrication by any subsequent cooperating mechanism "set-in-line" with the exemplary machine while continuously feeding stock Z left to right, Fig. 1 to the flier D and beyond to auxiliary push-pull pinch-feed rolls C1L. As shown, all the rolls, C, C1 and C1L have grooved peripheries conformed to the particular shape of the stock being straightened, as hexagonal, round, etc. When the stock Z in its left-to-right travel, Fig. 1, comes under the feeding traction of push-pull pinch-feed rolls C1L then a considerable traction or feeding force may necessarily be exerted by said rolls C1L to prevent the van portion of the stock (especially when straigtening stock Z of round diammetrical cross-section) from axially rotating or twisting under the multi-flexing influence of flier D and to especially pull the last portion of stock thru the rotary flier D which coacts with feed rolls C in producing accurately straightened stock Z or sub-lengths Z1.

Superimposed over the speed-reduction unit 124 on table-member 144 is the preliminary straightening roll-stand ensemble including rolls C1, C, C1, top left Fig. 1.

Superimposed over the speed-reduction unit 121 on table-member 144 is the roll-stand ensemble of pull-push pinch-feed rolls C1L.

Feed-rolls C, C1 rotating with spindle-arbors 171, as well as rolls C1L on spindle-arbors 171A, are all power operated between the speed-range of 56.9 and 170.7 R. P. M.; and all these rolls feeding stock Z at the same rate, which in the exemplary machine is in the order of from 70 to 210 feet per minute.

Roll stand stock feeding and straightening

As to construction, the design of the feed-roll stands is such that each of the roll-ensembles can be freed from the table member 144, etc. as by the extraction of bolts, dowels, etc. and then removed therefrom without other major disassemblage of the rest of the machine. This is made possible with the power-driven feed-roll units by the more or less telescoping drive arrangement of the universal-joint members 150 (or 150A) Figs. 2, 7, between the spindles of the several power-distributing gear-boxes and the projecting square ends of the roll-arbors 171—171A as shown at right in Fig. 12. With the above "unit assembly" design, any one component roll-unit ensemble can be easily removed and transported for alterations or repairs to the machine shop which in a modern steel plant may be located a mile distant from the location of the stock straightening machine hereof.

The individual rolls C, C1 (or C1L) may also be removed and changed on their several arbors 171 (or 171A) by the simple expedient of removing the front roll-stand frame 125 (or 125A, in case of changing rolls C12) which frame 125 is fixed to its supporting companionate L-shaped roll-stand frame 126, etc. by the stud-like spacer-bar member 143 (or 143A); to facilitate such removal or changing of rolls C, C1, as to accommodate different cross-section sizes of stock Z, without disturbing the operating set-up of the roll-stand ensemble, it is necessary that when removing the roll-stand frame 125, as above, to also include the roll-boxes 134 with their adjusting-screws 135; but as adjusting-screws 135 located on the operator's side of the machine, bottom left Fig. 2, are (partially) journalled in the roll-stand cover-plate 157, and held thereto by the multi-bearing cap-plate 128, it is first necessary to remove the cap-screws 128S and the cap-plate 128 from cover-plate 157 to allow the desired removal of adjusting-screws 135 with or at the same time as the removal of the side frame 125 from the roll-stand ensemble, Figs. 1–2.

Following the above "stripping-off" of the side-members of the roll-stand ensembles there still remains the operation of un-clamping the rolls C, C1 from their arbors 171, etc., before said rolls may be slipped forward (analogous as from left to right in Fig. 7) off over the ends of the projecting arbors which are now supported only by the remaining side-frame 126, etc. of the roll-stand ensemble.

Rolls C, C1, as well as rolls C1L, are clamped in their operating positions on arbors 171—171A via the arbor-quills 172—172A and washers 175—175A by the hexagonal nuts 176—176A; the rolls C, C1, as are also the rolls C1L, Fig. 7, are keyed to the arbors 171—171A by the well known half-circular type keys 174—174A, Fig. 7; a similar set of keys 173—173A being used to insure that the arbor-quills 172—172A will turn with the arbors, thus guarding against any tendency of quills 172—172A to seize in the bronze bushings 19—19A in which they turn, and also to guard against the loosening of nuts 176—176A which might occur if there was any chance that the quills 172—172A could get loose relative the arbors 171—171A and turn thereon; all of which is guarded against by the shown arrangement of proper keying for the several component parts as above described.

The purpose of changing rolls C, C1 or C1L on their arbors 171—171A, just described, is not only to permit replacement of rolls due to wear or for breakage, but especially for the purpose of equipping the several roll-stand "ensembles" with rolls grooved for a different size or shape of stock Z.

Rolls C1, C and C1L are grooved as shown to fit different shapes of rod-like stock, as polygonal, round, or rectangular rod-like strips. Thus these rolls are distinguished from the flexing rolls to be described, i. e. I, J, O, U, and V of Figs. 16-17.

In making changes in the roll-sizes to accommodate variations in diameter of the above rod-like stock Z; the rolls, relative to the true path of stock Z, are given vertical adjustment to maintain this true path of the stock which is always concentric with a projected line from the true longitudinal axis of rotation of the multi-flexing rotary flier unit D; therefore there is provided in the exemplary machine the screw-controlled means (including 20—23, 133—142A, Figs. 1-3, 5, 7 and 12) for adjusting the top-rolls C, C1 or C1L to and from the stock's true path. There is also provided special means, Figs. 5, 12-13, for adjusting the lower-rolls C, C1 or C1L "en masse" to or from the stock's true path; the roll-stand ensembles, including side-frames 126—126A, etc., being accurately positioned on the table-member 144, in the path of stock Z by the vertical stud-members 163—163A, which studs are fitted and clamped to the table-member 144 as shown best in Figs. 5, 12, 14, their upper ends being turned-down to act as combination dowels and studs over which the component L-shaped members 126—126A of the roll-stand ensembles vertically fit and are so guided that by the freeing of the lock-nuts 163N, Figs. 12, 14, the wedge-adjustment plates 129—130, Figs. 5, 12-13, may be moved longitudinally forward or back in the path of stock Z by lead-screws 160—161, Figs. 5, 13, beneath the roll-stand ensembles and, by being so adjusted, the several top inclined surfaces of the wedge-adjustment plates 129—130 which engage and support the roll-stand ensembles on the several companionate inclined surfaces of the bottoms of 126—126A, Figs. 5, 12, cause the roll-stand ensembles (and especially the bottom series of rolls C, C1 or C1L) to be raised or lowered "en masse" according to the desire of the operator to position said lower rolls to operate in the true path of stock Z as established by the axis of flier D.

As shown clearly in Figs. 1-3, 5, the adjusting lead-screw 160, described above for moving the wedge-adjustment plate 129 for vertically positioning the ensemble of lower rolls C, C1, extends rearwardly the general structure of the first exemplary machine so that its square-milled end is easily accessible for turning by any suitable crank-wrench analogous to the crank-wrench 66 shown in dotted outline in Fig. 7; but the adjusting lead-screw 16, Figs. 5, 13, for moving wedge-adjustment plate 130 for vertically positioning that "ensemble"; which includes the lower roll C1L, Fig. 12, is provided with a right-angle control extension (which includes mitre gears 151—151A and the shaft 152 with its bearing supports 64, Figs. 2, 13) which right angle arrangement allows for free and accessible turning of 161 from the operator's side of the machine.

It is understood that the adjusting lead-screw 160 is journalled in the enlarged body of one of the vertical adjustment studs 163, central right Fig. 5, and that the end thrusts of this lead-screw are absorbed by the said vertical adjustment-stud 163 thru the collar-members 162—162 affixed thereto; likewise the adjustment lead-screw 161 is journalled in vertical stud 163A, Figs. 5, 13, and that the end-thrusts of this lead-screw are absorbed by 163A thru the collar 162A on one side of 163A and by the projecting-hub of mitre-gear 151A on the other side of vertical stud 163A, Fig. 13.

Following the completion of any lower-roll adjustment of either roll-stand ensemble, the threaded nuts 163N (which were previously loosened to allow the lower-roll adjustments to take place) are tightened to rigidly lock said roll-stand ensembles with the table-member 144; this locking is possible due to the fact that the wedge-angles of 129—130 are of such a low order that, aided by the friction of the several cooperating components, there is no tendency for the several wedge-members to slide one upon the other when nuts 163N are tightened down on studs 163 or 163A.

In the adjustments of the vertical pairs of rolls C1, C1L, which specifically act on stock Z to feed Z from right to left as in Figs. 5, 12, 15, provisions are made to always keep said rolls C1, C1L thru their boxes 133—133A, Figs. 12, 15, an optimum distance apart by the wedges 119, Fig. 14, and their adjusting-screws 120, Figs. 12, 15.

*Multi-flexing stock straightener*

Long stock Z in its left-to-right passage, Figs. 1-2, thru the machine, and after emerging from feed-rolls C, C1, of the roll-stand ensemble at left, next enters a rotary flier D, Figs. 1-2, which normally performs the multi-flexing operation of finish-straightening stock Z and therefore incidentally contributes to the uniformity of the sub-portions Z1 produced by the "next-in-line" fabricator mechanism.

In the operation of finish-straightening, the stock is flexed by rolls O, at middle of Figs. 6, 17, by being rapidly revolved in small circles about its own line of horizontal feed; the small circles being exaggerated in said figures for clearness. These circles are smaller in diameter than the rod stock itself. The portion of the stock thus flexed is that between fulcrum-rolls J and U which, when they engage the stock, hold it in its line or axis of horizontal, longitudinal feed, at left of J and right of U, so that rolls O, between J and U, revolve, flex and thereby straighten only the successive portions of the length of the stock between the rolls J and U at left and right of O, as the stock is fed left to right. All the rolls I, J, O, U, V are rotated on their own axes by the feeding movement of the stock in contact with the rolls. Fulcrum rolls I, J, U, V otherwise are stationary and hold the stock in its line of feed. But flexing rolls O, in addition to their individual rotation on their own independent axes by the stock, and in order to revolve the stock in said small circles for straightening it, are revolved about the central line of stock-feed by means of power applied as by way of V-belts R, Figs. 1-6, 16.

The transmission between driving belts R and flexing rolls O is as follows. Belts R rotate hollow driving member 221, 13, 13, Fig. 24, the belts running in V-grooves over portions 13, 13 at the ends of 221. Member 221 is mounted on roller-bearings 220 for rotation about the line of stock-feed as a center of rotation. An arbor 229 is mounted eccentrically inside hollow driver 13, 221, 13, said arbor being revolved but not rotated by said driver, such revolution being in a small circle about the axis of rotating driver 221, i. e., about the line of stock-feed as a center of revolution of arbor 229. In wells in rotatable arbor 229 are mounted the flexing rolls O secured thereto so as to be revolved by the revolution of 229, so that flexing rolls O also and their common center, are revolved about the line of stock-feed thereby revolving the portion of the stock between rolls J and U. Rolls O are eccentric to the center of driver 221 so that rotation of the latter causes revolution of rolls O. Thus the set of flexing rolls O as a whole is revolved by power from belts R, and the individual rolls O are rotated by the stock in its longitudinal feeding movement, i. e., by power derived from the stock-feeding mechanism. It is the revolution of rolls O which flexes and straightens the stock as the latter moves longitudinally left to right causing rotation of individual rolls O on their respective axes.

Arbor 229 is formed with a central hollow horizontal perforation, Fig. 22, thru which stock Z is fed, see middle of Fig. 16, from fulcrum-rolls J at left. Flexing-rolls O in their wells in arbor 229 project into said perforation and therein make their rolling contact with the stock. It is at this point that the rapid revolutions of arbor 229 and set of rolls O about the line of stock feed, flex the stock furthest radially away from said line at the center of driver 221, i. e., to the limit of the degree of offset from said line and center, of the common center of the plurality of rolls O in the set.

Arbor 229 is not positively rotated, altho, in being revolved by 221, it is liable, unless positively restrained, to more or less slippage around on roller-bearings 238, in a direction of rotation on its own axis. Arbor 229 is, however, positively and rapidly revolved about the axis of rotatable driver 221, and about the center of the stock in the line of stock feed at left of rolls J and right of rolls U, in a small circle proportioned to the eccentricity of the mounting of 229 inside hollow driver 221, i. e., in proportion to the degree to which 229 is offset from the center of rotatable driver 221, i. e., from the line of stock-feed. The eccentric mounting of arbor 229 in driver 221, whereby 229 is revolved but not rotated positively by 221, is as follows. Arbor 229 is mounted inside hollow supports 234. The latter in turn are mounted inside hollow rotating driver 221. Supports 234 are secured to driver 221 by threaded radial studs 234A. By radial adjustment of these studs, the supports 234 are set eccentric to the center of rotation of driver 221, i. e., eccentric to the line of stock feed, because 221 is concentric with that line. Thus, when 221 is rotated, it imparts a special motion to arbor-supports 234, which includes first, rotation of 234 about their own axes, by the rotation of 221, (the rotation of 234 being about their own axes which lie parallel to and radially outside of the axis of rotation of driver 221, and second, revolution of supports 234 and their axes, bodily about the center of rotation of driver 221. It is this revolutionary movement of supports 234 which causes the desired revolution of arbor 229 and therefore the desired revolutions of rolls O and the stock about the line of stock-feed. Arbor 229 is compelled to participate in said revolutionary movements of supports 234 because of its mounting inside them. But arbor 229 is separated from supports 234 by the anti-friction bearings 238, so that 229 is not compelled to share the rotatory movement of said supports 234 with rotating driver 221. Thus the rapid rotation of driver 221 causes high-speed revolutions of supports 234, arbor 229 and flexing rolls O, about the center of rotation of 221 which is the line of stock-feed.

Rolls O are adjustable radially in their wells inside arbor 229. Thus they can be set to press against the surface of the rod stock of desired diameter, so that they individually are rotated on their own axes by the feeding movement of the stock passing between them. Since the stock is confined between the rolls of the set, the stock is revolved by the revolution of the set about the line of stock-feed; the common center of the rolls revolving about said line of stock-feed. When stock Z, Figs. 17–19, is a polygonal steel rod, such for example as the hexagonal rod shown, and when a plurality of rolls O are employed as shown, sufficient in number to confine the stock inside the set of rolls, (at least three rolls O for hexagonal stock as shown), then the rigidity of the steel rod and the corners of its polygonal sides, prevent rotation of the set of plural rolls about the center of the roll-set, i. e., sidewise around the circumference of the rod; since rolls O are held pressed against the plurality of sides of the rod, and ball-bearings 238 free the arbor 229 and rolls O from the compulsion of being positively rotated with the rotation of arbor-driving means 234 and 221. Thus the portion of the rod Z between rolls J and U, while being revolved laterally and straightened by rolls O, is prevented from rotation (turning or twisting on its own axis); the polygonal rod itself constituting a means for holding arbor 229, by way of rolls O, from rotation while the rolls O and the stock are being revolved by belts R and driving means 234, 221.

To provide for cases where a round rod (of circular cross-section) is being straightened by this machine, other means than the rod itself is provided to hold arbor 229, flexing rolls and the stock from rotation, i. e., to hold the set of rolls O from rotation about the center of the roll-set, this other means acting in cooperation with the above relations between 234, ball-bearings 238 and arbor 229 which free the latter of compulsion of positive rotation by and with driving means 234, 221. Such means of holding arbor 229 and round stock from rotation (i. e., holding roll-set O from rotation about the axis of the set itself as distinguished from the desired revolution about the line of stock-feed), may be that disclosed, as follows. This mechanism not only prevents twisting of the rod-stock by sidewise slippage rotation of the set of flexing rolls O on its own axis, but prevents marring of the stock-surface by such side-wise roll-slippage transversely of the direction of stock-feed, i. e., transversely of the direction of rotation of individual rolls O on their respective axes. For this purpose, two sliding locking members 232 like that of Fig. 25 are located as in Fig. 24, and these operate in complete assembly in Fig. 16 as follows. Each sliding locking member has sliding projections or jaws 232A, 232B on its opposite faces. One jaw is vertical and the other jaw is horizontal, in order to allow for the two components of the movement of revolution of harbor 229 about the line of stock-feed and center of rotation of 221. The vertical sliding jaw reciprocates a little up and down in a slot in stationary trunnion 77T at left, Fig. 16, or stationary trunnion 79T at right. The arbor 229 is formed with a slot receiving the horizontal jaw and said arbor slides a little horizontally back and forth along said horizontal jaw. The confinement of the two jaws of each locking member by the slots, couples the revolving arbor 229 to said stationary members 77T, 79T, so that said revolving arbor cannot rotate on its own axis, i. e., such confinement stops the tendency of the arbor to rotate around its own axis, on ball-bearings 238 located between the arbor itself and its supports 234 which latter rotate and also revolve, said ball-bearings permitting revolution of 229 with 234, without compelling it to rotate with 234 and 221. Such sliding relation of said jaws on coupling 232 therefore leaves arbor 229 free for its revolution by supports 234, so that flexing rolls O inside 229 and secured thereto are given their desired stock-straightening revolution. The operation of the two jaws on opposite sides of coupling 232, in permitting the revolution of arbor 229 about the line of stock-feed and center of rotation of 221, is as follows, the two jaws extending at right angles to one another. As 229, in its revolution, rises, the vertical jaw moves up in its slot in the stationary member, and vice versa. Meanwhile, while arbor 229 is moving up if the rest of its movement of revolution is away from the observer of Fig. 16, for example, arbor 229 slides along the horizontal jaw, (while the vertical jaw is sliding up in the stationary member), so that the combined simultaneous effect of the two jaws is to permit the circular motion of arbor 229 in its revolution, the arbor moving continuously back and forth along the horizontal jaw while the vertical jaw is moving continuously up and down in its slot in the stationary member; and all the time, the walls of the confining slots in arbor 229 and the stationary member, hold coupling 232 from rotation, and thence, by the interlock between arbor 229 and the stationary member by way of said coupling 232, the walls of said slots hold arbor 229 itself from rotation by and with 234 and 221.

Thus, by means of couplings 232, even a round rod is revolved about its feeding axis, in the straightening operation by rolls O, without any rod-rotation, turning or twisting, or any surface-marring, due to movement of the flexing rolls sidewise in bodily rotation in a circle about their joint or common axis, around the periphery of the rod; the rolls O being limited to individual rotation about their respective axes by the feeding movement of the rod, and to revolution of the roll-set as a whole, and of the common center of the set, in a small circle about the feeding axis of the rod. It is to be noted that all the above movements of revolution are with reference to the center of rotation of belt-driven member 221, and that the latter is concentric with the line of stock-feed, so that said revolutions cause revolution of the stock itself by rolls O about its own line of feed, in small circles preferably of smaller diameter than the stock so that the portion of the stock being revolved and straightened between fulcrum-rolls J and U is not much out of direct line with the rest of the length of the stock. It is to be noted also that it is the eccentric mounting of roll-carrying arbor 229 which is the basis of the lack of rotation of the group of rolls O around the periphery of the stock, for if the revolutionary movement of the roll-group were due solely to an offset relation of the rolls to an arbor which was concentric with the line of stock-feed, then the arbor would not only revolve the offset rolls around the line of stock-feed, but would cause the roll-group to rotate about its own axis around the periphery of the stock while it was being revolved about the line of stock-feed. And it is that eccentric mounting of the arbor relative to the rotatable driving means, together with the freedom of the arbor from positive rotation by the same driving means (due to balls 238), which provides for the freedom from positive rotation of the roll-group around the periphery of the stock, during the revolution of said group about the line of stock-feed.

Thus in this machine, as above, either a polygonal or a round rod, as desired, is straightened by revolution of its successive portions which instantaneously are located between the fulcrum rolls J and U, and there are subjected to revolution by flexing rolls O as the rod in fed left to right between the several rolls, the rod lying in the line of feed as it approaches rolls J and as it leaves rolls U; and the rod being revolved at O, for final or refined or finish straightening, in a circle which preferably is smaller than the diameter of the rod itself.

As to construction, flier D in general is supported from the table member 144 by the two standards 26—26 Figs. 1–2, 16, 24, and their cap-members 25—25 which in turn cooperate with 26 to sub-support the anvil-roll housings 77, 79, Figs. 16, 24; the anvil-roll housings 77, 79, in addition to housing the anvil-rolls, I, J and U, V, are provided with oppositely and inwardly extending trunnions 77T, 79T over which are lightly pressed the diagrammatically shown double-row anti-friction ball-bearings 220, Figs. 16, 24; the anti-friction bearings 220 having their outer-races lightly pressed into the rotating flier-driving-members 13—13, Figs. 16, 24.

Means for preventing the entrance of dust, etc., into the ball-races of bearings 220—220 are provided in the form of the dust-shield members 222—222 which are attached to the flier driving members 13—13 by suitable screws 223; the clearances of the dust-shield members 222—222 with the trunnions 77T—79T are in actual practice every minute and so, aided by centrifugal force, they easily retain the provided lubricant for the bearings 220—220, Figs. 16, 24.

The rotating "flier-driving" members 13—13 are formed with a plurality of annular V-grooves thru which to receive power from motor P via the multi-strand V-belts R, and are spaced apart and cooperatively supported one with the other by means of the intermediate barrel-like spacing-member 221; said spacing-member 221 containing a plurality of openings 221A, Figs. 1–3, 5 thru which the operator may have access to re-position multi-flexing rolls O, Figs. 16–17 to conform with different cross-section sizes of stock Z; this operation preferably being performed by first loosening the three, more or less, check nuts 75, Fig. 16, and then backing-out (when necessary) the several adjusting-screws 43 an amount sufficient to allow the insertion of a gauge section of the new rod-like stock to be straightened; the rolls O are then adjusted into uniform contact with this gauge-acting portion of stock Z, following which the screws 43 are again locked by check-nuts 75 and the gauge-acting portion of stock is then withdrawn to allow the machine to enter upon production; simultaneous with the above re-setting of rolls O to a stock-gauge the rolls I—J and U—V are likewise reset to the size of stock Z to be operated upon via set-screws 40—40 and lock-nuts 41—41, Figs. 16, 24.

The stock-engaging rolls I, J, O, U and V Figs. 16–18 may all be of the same detail construction, which is in the exemplary machine shown as having integral projecting trunnions 224—244; said trunnions being rotatively mounted in the pairs of bronze-bushings 225; said bushings 225 being forced into the transverse holes 226H of the pairs of trunnion support plates 226, Figs. 16, 20, 22; and these pairs of support plates are "bridged over" by an adjustment plate 227 Figs. 16, 20 thru which the adjusting-screws 40, 43 make contact to back-up and adjust plates 226 (with the particular roll I, J, O, U or V which they support) to cause conformation of the adjusted rolls with the particular diameter of stock about to be finished straightened thru the ensemble of flier D.

The small ensembles of the rolls, I, J, O, U or V, with their supporting side-plates 226, etc., fit into radially positioned openings or wells 228, Figs. 16, 20, 24, located in the anvil-roll supports 77, 79 and also in the flexing-roll arbor 229; the ensembles of the three rolls O, with their supporting side-plates 226, etc., contained within the wells 228 of arbor 229, are retained therein by the heavy encircling steel-member 230 which is lightly pressed over the central portion of the stock-flexing-arbor 229 after the ensembles of rolls O are placed in the wells 228; and member 230 is held positively in its retaining position by the wire-locked cap-screws 231, Figs. 16, 22–23.

The arbor 229 carrying flexing rolls O is restrained from turning with the driving elements R, 13—13, 221 at times when no polygonal stock extends between rollers O, by means of the cross-sliding jawed couplings 232, Figs. 16, 22, 24–25 the jaws 232A of which closely fit and mesh with the corresponding openings or slots 229A—229A, Fig. 23, formed in the trunnion-ends of arbor 229, and the other jaws 232B of which engage with the openings or slots 233 formed in the ends of trunnions 77T, 79T, Fig. 24, all of which effects a smooth entrance of the van of the stock between three rolls O. When the van of the stock has passed completely into position between the rolls I, J, O, U and V the restraining action of the anvil-rolls I—J and U—V, acting on the polygonal sides of stock Z, (as hexagonal, Fig. 18), will reduce the need, more or less, of the action of sliding locking couplings 232—232 in restraining arbor 229 from rotating with the driving members of flier D, (save that said couplings yet cooperate, in keeping rolls O from moving circumferentially along the surface of the stock, with said three rolls themselves engaging only three sides of the hexagonal stock); so that, during most of the passage of stock Z thru the straightening mechanism of Fig. 16, couplings 232—232 have less restraining to do than before the stock-van enters between flexing rolls O; altho said couplings continue to be reciprocated vertically by the revolution of arbor 229 until the last portion of a long stock-length has passed rightward, Figs. 16–17, out of engagement with the anvil rolls I—J, when they resume their full restraining control of arbor 229.

The stock-flexing arbor 229 is more or less eccentrically suspended within the driving elements 13—13, 221, of flier D, Fig. 16, via the off-center adjustable supports 234 whose projecting and threaded dowel-studs are trunnions 234A engage with the diametrically opposed reamed holes 235 formed "half and half" in the several driving elements 13—13 and 221 Fig. 24 of flier D which driving elements are normally held together by cap-screws 236. The studs 234A fitting said reamed holes closely so as to incidentally act as mutual driving means between the belt-driven members 13—13 and their spacing member 221; and all coacting to cause the rapid actuation of the multi-flexing action of rolls O on stock Z driven from motor P via belts R and resulting in the accurate straightening of the continuously fed stock Z having left to right passage thru flier D, as indicated in Fig. 6 at O, O in a diagrammatic manner exaggerated for clearness.

The rolls O, Figs. 17–18, within the multi-flexing arbor 229 are positioned more or less "off-center" thru the operator's adjustments of the hexagonal nut-members, 237—237, to transversely position and lock the projecting and supporting studs 234A of bearing-supports 234 positioned in the reamed holes 235 of flier D's rotating members 13, 221, 13, Fig. 16; said adjustments of nuts 237 being of a sufficient degree to produce the necessary stock-finishing eccentricism, or throw, of the arbor 229 and the rolls O for transversely multi-flexing the stock Z (at this central point of flier D) out of its true longitudinal path between the series of anvil-rolls I—J and U—V, Fig. 17, at the stock entering and stock leaving ends of flier D, Fig. 16. The anvil-rolls I—J and U—V acting both as guides to keep the stock in its true longitudinal path, and also functioning as anvil or fulcrums for the mid-positioned multi-flexing and more or less off-centered rolls O.

Stock-turned rolls I, J, O, U and V offer but minute if any frictional hindrance to the feed and passage of stock Z thru them as anvil-rolls and flexing rolls respectively; and owing to the rotative construction and individual mounting of these devices, they contribute largely to the successful operation of the multi-flexing process of this invention for the straightening of non-circular as well as that of circular cross-sectioned stock Z by the respectively revolving and rotating mechanisms in the organization of Fig. 16.

The adjustable off-center bearing supports 234, being locked to the driving elements 13—13, 221 by studs 234A, necessarily not only will revolve bodily about the axis of said driving elements (i. e., revolve about the true axis of stock Z), but also will rotate about their own axis adjusted to be eccentric to said true axis; and to provide means to support multi-flexing arbor 229 so that it will revolve with supports 234 about their eccentric axis but will not rotate with them about the true stock-axis, the ball-bearing connections 238 are provided between said supports 234 and multi-flexing arbor 229, as shown in Fig. 16, where the diagrammatically depicted double-row anti-friction ball-bearings 238, Figs. 16, 23, are shown as having their outer-races lightly pressed into the bores of the off-center supports 234, and their inner-races lightly pressed over the projecting trunnion portions 229T of the stock-flexing arbor 229. Thus as stock Z, Fig. 18, is fed to rollers O, and as the stock causes rotation of said rollers on their axes transverse to the stock-feeding axis by the feed-rolls C, C1, C1L, the stock-flexing rollers O are revolved bodily in small circles about the stock-feed axis while they remain in engagement with the same sides of the stock preventing twisting of the stock, so that the stock is flexed but not twisted as shown in Figs. 18 and 6; the balls 238 permitting supports 234 to revolve and rotate without causing rotation of flexing arbor 229 or rotation of rollers O around the stock but supports 234 by their bodily revolution about the true stock-axis causing like revolutions of arbor 229 and rollers O about the stock-axis; and arbor 229 and rolls O being restrained from all movement around the stock itself (as distinguished from their revolution about the axis of the stock) by means of the engagement of rollers O with the polygonal sides of the stock, or when round rods are being straightened, by means of two of the locks 232 of Fig. 25 as in Fig. 16. As shown in Figs. 18 and 22, for hexagonal stock there are three fulcrum or anvil-rolls in the set or group of anvil-rolls I, one for every alternately successive stock-side; and the same is the fact as to flexing-rolls O, and the other anvil-rolls, J, U and V. Similarly there are four rolls in each set when octagonal rods are being straightened. And in case of a square rod there are four rolls in each set. None of these rolls is shown as grooved, as are the rolls of the roll-stands in Figs. 1, 28 and 29, because the rolls here preferably are not feed-rolls, but anvil-rolls I, J, U and V act as fulcra for the flexing by rolls O intermediate I, J at one end and U, V at the other. As to the fulcrum or anvil rolls I, J, U, V, their arrangement shown in Figs. 16, 17, two sets, I, J, at one side of flexing rolls O, and two sets, U, V at the other side of rolls O serves to hold the stock in its true axis of feed from being bent or twisted by the action of rolls O save for the desired bending of the desired length of longitudinally moving stock Z extending at any given instant between the fulcrum rolls J and U which are nearer to rolls O. As shown, at the two sides of rolls O, all sides of stock Z are engaged by the fulcrum-rolls of the two sets, as I, J, or U, V, i. e., each stock-side not engaged by a roll of one set of two adjacent sets, is engaged by a roll of the other set. This distribution of all the fulcrum-rolls on each side of flexing rolls O imparts the two effects of first adequately limiting the length of the longitudinally moving stock being flexed by the central set of rolls O, to the desired distance from rolls O in two directions longitudinally of the stock, by the provision of two sets of adjacent fulcrum rolls which insure against premature stock-flexure, and second, of making practicable a structure for each set of fulcrum-rolls, see Fig. 18, in which there is ample space around the stock for all the rolls thus needed in the set, producing a practical structure as shown in Fig. 16 including the provision of roll-adjusting means to adapt the rolls to different thicknesses of rod-like stock. Also by this provision of enough fulcrum rolls, as at I and J or at U and V, to engage all sides of polygonal stock, the latter is prevented from being twisted during the stock-flexing by rolls O; this result being attained because fulcrum-rolls I, J, or U, V in addition to their engagement with all sides of the polygonal stock are journaled in fixed supports 77, 79, Fig. 16. But in the case of flexing rolls O they preferably are limited to only one circumferential set of rolls, in order to obtain proper action of stock-straightening, three being indicated for hexagonal stock for engagement with alternately successive stock-sides, this being an arrangement involving the maximum desired number of flexing rolls O for a single set in consideration of the available space circumferentially around the stock. But this number is sufficient because it is not necessary to employ any more rolls O for the purpose of engaging all the sides of the polygonal stock, in order to grip the stock more firmly as in the above case of firm gripping by the fixedly mounted fulcrum rolls, this being due to the provision of the locking couplings 232 which prevent rolls O from moving circumferentially along the surface of the stock, so that when said rolls are adjusted to bear firmly on, for example, three sides of the polygonal stock shown, they grip it sufficiently to move it in circles about its axis of feed. Such circles are largest at rolls O and successively become smaller in opposite directions respectively toward fulcrum-rolls J and U, Figs. 6, 30–32. And when the rod Z is round, the same three rolls O are sufficient, and in such case the locking devices 232, in lieu of prevention of movement of rolls O circumferentially around the surface of the stock while said rolls are being revolved around the stock-feed axis, can be depended on to prevent such movement of rolls O. It is practicable, however, in any case, to provide four rolls O, as for square rods, as shown in Figs. 33–34. And when stock Z is round, the four sets of fulcrum-rolls I, J, U, V of Figs. 16–17 are proper for their purpose, each set with preferably two rolls.

The two locking devices like 232 of Fig. 25 are shown in partial assembly in Fig. 24, and Fig. 16 indicates their complete assembly between the trunnions 77T and 79T of anvil-supports 77 and 79 adjacent their outer faces, and on the inner faces the trunnions 229T of revolutionary flexing arbor 229. The jaws 232A, Fig. 25, of the inner faces of each of these sliding locks against axis-rotation of arbor 229 engage, Fig. 16, in slots 229A, Fig. 23, in trunnions 229T of arbor 229. And the jaws 232B, Fig. 25, on the opposite faces of locks or couplings 232, engage, Figs. 16, 23, and 24, in slots 233 in trunnions 77T and 79T of anvil-supports 77 and 79. In operation, as flexing arbor 229 and its rollers O are revolved by the eccentric revolution of arbor-supports 234, said jaws 232A, 232B hold arbor 229 from rotation about the stock-feed axis without interfering with the bodily revolution of both the arbor 229 and its rollers O about said stock-feed axis to flex the stock without twisting it. Thus the prevention of rotation of arbor 229 is prevented by the positive interlocking by jaws 232A, 232B. And the revolution of arbor 229, on its eccentric mounting with its supports 234 adjusting to desired eccentricity with driving elements 13, 221, 13, is permitted by the sliding of jaws 232A, 232B in the slots in the stationary trunnions 77T, 79T and the revolving trunnions 229T, Fig. 23, of arbor 229. Thus, as arbor 229 revolves, the walls of its slots 229A in revolving trunnions 229A, slide on jaws 232A of the locking couplings 232; also the couplings 232 themselves freely move vertically by way of the sliding of their jaws 232B in the slots 233 of stationary trunnions 77, 79. Locking couplings 232 thus, (in the case of round rods, and in the case of a polygonal rod when no such rod extends between rolls O but a van end of such a rod is being fed by the pinch-rolls C1 and is about to enter between rollers O), prevent the arbor 229 from rotating, with the result that in the case of round rods the rollers O are prevented from sidewise movements of their own in a direction circumferentially of the rod along the surface thereof;

and in the case of a polygonal rod in process of feeding toward rollers O carried by the revolving arbor 229, the entrance of such polygonal rod between the rollers O is facilitated as the rollers, in readiness to be rotated on their own axes by the fed stock, are being revolved bodily in small circles about the axis of stock-feed; and in general the continued availability of couplings 232—232 for holding rollers O from side-wise slippage or tendency to sidewise slippage circumferentially along the surface of the stock, prevents all undesirable marring of the stock-surfaces.

Means for preventing the entrance of dust, etc., into the ball-races of bearings 238—238 are provided in the form of the dust-shield members 239—239 which are attached to the rotating supports 234—234 by suitable screws, 240, Figs. 16, 23; the clearances of the dust-shield members 239—239 with the stock-flexing arbor 229 are in actual practice very minute and so, aided by centrifugal force of the rotating elements of flier D they easily retain the provided lubricant for the bearings 238—238, Figs. 16, 23.

Stock Z is continuously fed left to right, Fig. 16, via the power-operated rolls C, CI, CIL, Fig. 6, to and thru the anvil-rolls I—J, to the multi-flexing finish stock-straightening rolls "O" and to the second series of anvil-rolls U—V, Figs. 16-17, within flier D; and Z in this left to right passage thru D exerts a general rightward pressure Fig. 16, on the several components of D, all of which left to right forces are eventually absorbed thru the two flange members 77F and 79F, and thence thru the standards 26, Fig. 16, to the table-members 144 of the machine's structure; flange 77F is fixed to the left standard 26 by short cap-screws 82, while flange 79F is provided with threaded holes to receive the threaded ends of the long cap-screws 84 which pass, right to left Fig. 16, thru the right standard 26, and its cap 25, to pull flange 79F back to right against the abutting finished surface of 25—26, Fig. 16.

Standards 26—26 supporting flier D are kept in longitudinal alignment with the stock's passage by the key-members 32, fixed in the longitudinal grooved-slot cut in the bottom of 26—26; said key members 32 sub-extending therefrom to align and lock 26—26 with the companionate slot cut in the top surface of table-member 144, Figs. 16, 22, 24; and standards 26—26 are further fixed to table-member 144 by means of suitable bolts or cap-screws 241, Figs. 16, 21-23, so that flier D is rigidly fixed to 144 and kept permanently in alignment with the path of stock Z.

The long stock Z after emerging from the flier D is fed further to the right, Figs. 1-2, by rolls C, CI, to the push-pull pinch-feed rolls CIL which act to feed stock Z further to the right to the "next-in-line" fabricator.

*Synchronized and abortive controls for fabricators placed in series with exemplary machine*

When a fabricator is placed "next-in-line" for cooperative and tuned functioning with the exemplary straightening machine means are provided, such as variable speed transmissions K—KR, Figs. 3-4, to institute the periodic and rhythmic fabricating frequency of the fabricator's dies (G—H), whether or not this be a fabricator for producing linear uniformity of sub-portions ZI of long stock Z, thru the periodic tripping of the fabricator's slave clutch L for operating the dies (G—H).

In order that such clutch trippings shall be in a low order of frequency such as from 2 to 47 times per minute, more or less to cause fabricating of the sub-lengths in the order of from five to a score or more of feet in length, K's variable speed driven shaft 106 is directly connected, via the flexible coupling 166, to the high-speed driven-shaft 35A of the speed-reducer KR; the low-speed driven-shaft 106A of K's speed reducer KR normally driving the crank-plate 66 with its crank-pin 66—A, Figs. 3, 4, 7-9, to cause periodic and repetitive trippings of clutch L;

Master K's linear control of the sub-lengths, as fabricated by a "next-in-line" coacting fabricating mechanism, such as is phantomly outlined in the drawings, Figs. 1-5, is fully described in my prior application for patent, Serial No. 365,528, filed May 23, 1929.

As to the construction of this control, in the two exemplary machines, Figs. 1, 4, 7, the dial 97 is fixed to the support 102 and, as is customary, 97 is graduated into feet and inches; also the pointer 98, being rotatable in the exemplary two machines indicates on the graduations of dial 97, the length of the stock sub-length ZI for which master K is adjusted in its governing of the "next-in-line" fabricating mechanism; the index pointer 98 is fixedly supported on the top of the short vertical shaft 99 and on the bottom of this shaft is fixed the worm-gear 100; the indicating position of pointer 98 being synchronously changed on the dial 97 whenever the operator lengthens or shortens the fabricated sub-length by his manipulation of master K's speed-ratio thru the turning of the control-shaft 103 with a crank-handle wrench 65, Fig. 7, fitting the square-milled end of 103; and as the worm 101, Fig. 7 is attached to the shaft 103, and engages with worm-gear 100, the turning of 103 will of necessity also move the index pointer 98 about the face of dial 97 to graduations indicating the length of fabricated stock.

Shaft 103 Figs. 4, 7, thru which the operator adjusts the speed ratios of master K, is linked with the screw-adjusting bar 109 of master K via the universal joints 108, the shaft extension 103A and the mitre-gears 105, 107; shaft extension 103A being supported by the bearing bracket 104; and the ensemble of dial 97, pointer 98, shaft 99, worm-gear 100, worm 101 and worm-shaft 103 being housed in the support 102, see lower right Fig. 7.

In the case that the exemplary machines should be equipped with the foregoing master K—KR mechanisms to cause linear measuring with uniform spaced stock-fabricating, there needs must also be provided a manual control over the fabricating mechanism capable of being abortively operated at any instant of the exemplary machine's operation; to this end we have shown and provided the installation of such a manual operated and abortive tripping apparatus for clutch L which operates the fabricating mechanism; the operating ensemble of this tripping apparatus, Figs. 1, 3, 5, 7, includes the hand-trip handle Y, the transverse rock-shaft 27, the latching-pawl 200, the latch-block 201, the weight-operated instantaneous tripping rack 28, the rack-weight W, the cable anchor 203, the weight supporting cable 204, the suspension bracket 202, the cable guide sheave 212 and its pivot-stud 205.

The function of the foregoing components is that with the operator's desire to cause the institution of an abortive operating cycle of any subsequent fabricating mechanism that is coacting in "series" with exemplary machines to cause the dies (G—H) thereof to operate upon the stock, the operator is furnished means whereby he may, by the abortive tripping of clutch L, at times intermediate the periodic trippings of master K—KR, cause actuation of the fabrication elements at will; that is, the operator by depressing the hand control handle Y, Fig. 1, causes pawl 200, Fig. 5, to be raised free (via the connecting rock-shaft 27) from the latch-block 201 fixed to the rack 28; thus permitting rack 28 to be freed to be moved, right to left, Fig. 5, by the gravity acting weight W which is vertically guided within the tubular shield S, Figs. 4–5 and suspended therein by the cable 204 from the cable-sheave 212; the other end of the cable 204 being anchored to the rack 28 by the stud member 203, see center Fig. 5.

The weight actuated movement of said rack 28, right to left as above, is arrested in its extreme leftward position by the stop-rod 207 (central left Fig. 5) which is adjustably fixed to one of the reciprocating members (such as F1, Figs. 4–5) of the fabricator; hence, by the following left to right actuations of the fabricating mechanism, rack 28 will be returned rightwardly to its normal position of rest, shown in Fig. 5, where the pawl 200 acts to automatically lock rack 28 at right by its dropping in front of the latch-block 201; this locking of rack 28 by pawl 200 completes the cycle of clutch L's abortive hand-tripping apparatus all of which occurs in a very short duration of time.

The components of the apparatus beyond rack 28 thru which rack 28 functions to institute abortive tripping of clutch L include the non-keyed combination rack-pinion (29) and one direction clutch member (187), the shaft collars 48—48A, the one direction clutch-body 178, the locking-plunger 116, the plunger-spring 117, the clutch-body key 83, the shaft 147 (suspended from the table 144 by the pillow-block 146 and the bracket 145), the train of gears 177, 164, 66G; and the special clutch mechanism of Figs. 8–10 which is normally driven by the shaft 106A of K's reduction unit KR, until on those occasions when the operator is desirous of instituting an abortive hand-tripping of a cooperating fabricating mechanism (such as may be placed in line and used in cooperative "series" with the exemplary stock-straightening machine) at which time handle Y is manually depressed to disengage the pawl 200 from the latch-block 201 allowing the rack 28 to be forcibly pulled to the left, Fig. 5 by weight W; and in this forced leftward movement of rack 28 (the teeth of said rack being meshed with the teeth of the rack-pinion 29) causes pinion 29 to rotate anti-clockwise, Fig. 5, for at least one full revolution and, in so doing, causes the deep abrupt end of the circular cam-slot 29A, Fig. 11, of 29 to overtake the relatively slow and constantly rotating plunger 116 somewhere in this revolution to act thereupon as a driver for the remainder of this cycle so as to speed up the rotation of the crank-plate 66 to institute a substantial instantaneous and abortive tripping of clutch L; following this abortive tripping of clutch L, just described, mechanisms K—KR resume rhythmatic and periodic control of L's trippings and so continues as long as the fabricator is in operation; or until the operator sees fit to cause another abortive tripping of the clutch L by depressing handle Y.

Second exemplary machine

With reference to the construction and arrangement of the straightening elements in the second exemplary machine of Figs. 26–29 as "contra" that of the first exemplary machine of Figs. 1–6, the outstanding physical variation is in the "ensemble" of rolls C1, C, C1, which are (in the second exemplary machine of Fig. 26) positioned with their roll-spindles vertical so that a simpler construction of the power drive from motor P to vertical-rolls C—C1 is obtained by the simple expedient of utilizing a commercial worm-gear speed reducer 124V, Fig. 26 whose driven-shaft TV is positioned vertical upwards (as "contra" the horizontally driven-shaft T1 of the first exemplary machine of Figs. 1–6) so that vertical-rolls C—C1 may be conveniently driven from the universal-coupling member 150V, Fig. 26 which connects shaft TV with the sub-extending drive-spindle 167V of the said roll-stand "ensemble." Reel A here is mounted on a vertical axis, Fig. 26.

Power is distributed to the individual rolls C—C1 from the driving-gear 16DV fixed to the driving-spindle 167V, Fig. 28, which gear 16DV intermeshes with and drives the idler gears 170V and spindle-gears 16V, as illustrated by their several pitch-circle diameter in the plan-view of Fig. 27.

Roll-spindles 169V carrying that series of adjustable rolls C—C1 located upon the operator's side of the stock's left to right longitudinal path, bottom Fig. 27, are mounted and supported in the transversely adjustable C-shaped roll-spindle boxes 14V, 15A, 15W, Figs. 27–29. Rolls C1 facing the operator being mounted in boxes 14V with individual adjustment to and from stock Z and fixed rolls C1; and rolls C in boxes 15A—15W have individual adjustments as by 17—17 to and from stock Z and towards fixed rolls C, as well as being provided with group-adjustment means by which the entire group of straightening-rolls C may be withdrawn from their operating positions on stock Z or by which group-adjustment means they may be returned thereto without disturbing their operating set-up; the group return of rolls C to their operating position on stock Z being gauged by the adjustable stop-screw 98V Figs. 26, 29; all of which group-adjustment of rolls C is manipulated by the operator thru the hand-wheel 65V, Figs. 26–29, as minutely described in my prior application for patent, Serial No. 437,305 filed March 20, 1930.

The function of this second exemplary machine is analogous to that of the first machine with the single variation of that the plane or axis of the stock reel A is re-adjusted so that the natural curvature of the stock as it is uncoiled will conform to the curvature of the vertical axis or face-curvature of the rolls C—C1, i. e., the axis of reel A has been changed from horizontal to vertical, and the axes of the spindles of rolls C, C1, C1L have been changed to correspond.

Stock straightening methods

In the diagram of Fig. 6, there is illustrated the basic process of the first exemplary machine by which all rod-like stock (whether or not of polygonous cross-section), from a coil or in an otherwise general unstraightened condition, is accurately straightened.

This basic process of accurately straightening rod-like stock, consists (1) first of suitable means such as reel A for supporting the stock for dispensing when from a coil; of (2) pinch-feed rolls C1 for withdrawing or pulling the stock from the dispensing reel and for feeding it to the (3) group of staggered preliminary straightening or curvature back-breaking rolls C, which aid the (4) second-series of pinch-feed rolls C1 in feeding Z, now more or less roughly straightened into and thru the (5) rotary multi-flexing, accurate stock-straightening unit flier D and beyond into the (6) pull-push pinch-feed rolls C1L which assist rolls C—C1 in their rightward, Fig. 6, feed of stock Z and finally, as the rear end of Z leaves rolls C, C1, to pull the remaining portion of Z thru flier D and to feed it further rightward until the rear end of Z passes out of the tractive power-feed of rolls C1L.

In Figs. 26-29, depicting the second exemplary machine, the elements for the above six basic principles of straightening rod-like stock are utilized. The change, however, of the ensemble of rolls C—C1 from the horizontal axis of the first machine of Figs. 1-25 to the vertical axis of the second exemplary machine of Figs. 26-29, to correspond with the change from the horizontal axis of reel A of Fig. 1 to the vertical axis of reel A here, is advantageous for treating smaller rods, because it is preferable, in cases of wire-rods of a diameter of the order of one-quarter inch or less, to position such relatively small diameter stock when in coiled condition, in a horizontal position of the coil (i. e. on a reel-head A having a vertical axis as in Fig. 26); wherefore the vertical axes of rolls C—C1 of this figure are positioned vertically likewise, so as to cause the engaging curvature of said rolls to conform with the natural curvature of such small diametered stock as dispensed from reel A on a vertical axis.

From the above as to dispensing relatively small diametered stock from reel A on a vertical axis, it might seem that said second exemplary machine of Figs. 26-29 is adapted only for straightening such smaller diameters of stock Z; but that is not the fact, for coils of stock Z with diameters exceeding that range of small diameters, i. e. thicker than a quarter inch, may be straightened practically in a machine having the same vertical axes for reel A as for rolls C—C1; altho the first machine of Figs. 1-25 is preferred for straightening stock of the higher order of diameters which as distinguished from the order of smaller diameters, may be easily, and preferably are dispensed from a reel having its axis in a general horizontal position.

In the diagram of Fig. 30 there is shown diagrammatically a further rearrangement of elements for performing the aforesaid six basic principles of rod-like stock-straightening previously referred to in relation to Fig. 6; said rearrangement of elements combining, or rather dividing, the preliminary straightening of Z by rolls into two ensembles of said rolls; the first ensemble at left at C, C1 being like the vertical roll-spindle arrangement of the second exemplary machine of Figs. 26-29, with the axis of rolls C—C1 vertical (C being the spaced staggered grooved rolls which both straighten and feed the stock; and C1 being the grooved pinch-feed rolls); and the second ensemble at C2, C3 being like that of the first exemplary machine of Figs. 1-6, with the axes of rolls C2, C3 horizontal (C2 being the spaced and staggered grooved rolls which both straighten and feed the stock; and C3 being the grooved pinch-feed rolls); said two ensembles acting in planes at right angles to one another, and the two coacting in tandem to straighten the stock in two planes and feed it rightward to the rotary multi-flexing, accurate stock-straightening unit flier D, Fig. 16, to rolls C1L which pull the stock from D and cooperate with pinch-feed rolls C3 next to D at left in forcing the stock thru D, said pinch-rolls C1L also feeding the stock to a cooperating adjacent fabricator such as shear G, H, and pulling a rear end of stock away from whirling straightener D.

In the diagram of Fig. 31 is shown a simple arrangement for completing at least the last five of the above six basic principles of rod-like stock-straightening. In this arrangement of Fig. 31, D diagrammatically indicates the whirling straightener of Figs. 16-25, and it is assumed that the rod-like stock to be finished-straightened has been "drawn-to-size" on a draw-bench, (as indicated by the second dotted line above the arrow), and therefore was not coiled, as would be the case if Z were drawn thru dies on a bull-block or wire-drawing machine with Z wound up therefrom in coiled form as shown in reel A, horizontal or vertical as shown. Thus, here the first or preliminary straightening is not necessary, as by rolls C above or by an ordinary straightening flier with revolving dies, because here Z is in a more or less partially straightened condition as the result of the "straight-pull" of the draw-bench. Hence, in Fig. 31 the stock Z shown by the second dotted line above the arrow, may be entered directly into the pinch-feeding control of rolls C1 (reel A shown being omitted) and the stock thereby fed rightward into and thru the rotary multi-flexing, accurate stock-straightening unit flier D of Figs. 16-25, and thence to the rolls C1L and beyond to the cooperating adjacent fabricator tools G—H.

But the simple arrangement of Fig. 31 including reel A shown either horizontal or vertical, may be utilized to complete all six of the above basic principles of rod-like stock straightening. This would be when there was metal stock to be straightened of mild or low temper wherein there would be (1) ample power in the element D detailed in Figs. 16-25, to complete the accurate straightening of Z direct from the coil; and (2) where there would be sufficient tractive power in the feeding rolls C1 to both uncoil stock Z from A and force it thru flier D for complete accurate straightening as above; following which rolls C1L would feed Z beyond to the cooperating adjacent fabricator tools G—H.

In the diagram of Fig. 32 is shown a still further rearrangement of the elements for straightening rod-like stock, still containing the original six principles of Fig. 6; and in this last arrangement the van of the stock is loosened from the coil on reel A (horizontal or vertical as indicated) and inserted between the feed-rolls C1 (horizontal or vertical axes) which act to continuously feed Z rightwards into and thru a first flier DP (shown in detail in Figs. 16-25) preliminarily straightening stock Z by the multi-flexing process; stock Z is then advanced, without interruption of its continuous feed, into and thru the finish-straightening multi-flexing unit flier D (of design similar to DP), to the pull-push pinch-feed rolls C1L and beyond to the cooperating fabricator tool G—H.

*Modifications of multi-flexing mechanisms*

The diagrams of Figs. 33-34 are transverse sectional elevations of two stock straightening machines in the general order of those of Figs. 1-32 including the novel whirling straightener of Figs. 16–25; these transverse sections being taken at a mid-longitudinal point of such a multi-flexing whirling stock straightening unit, but showing modifications of the construction of Figs. 16–25.

In Fig. 33 there has been substituted for the stock-flexing arbor 229, which in Fig. 16 supports the flexing-rolls O, a parallel supporting-member 242 for supporting and actuating the same flexing rolls O; said support being actuated by the two crank-pins 243, which engage ends 242A of 242. Pins 243 may be solid eccentrics, but are preferably crank-pins set in crank-plates 244, with means provided for adjusting said crank-pins 243 more or less off the center of rotation of the supporting crank-plates 244 to furnish the desired "flexing" of the stock by rolls O which are positioned on the support 242 substantially around the path of the stock Z in general as in Figs. 16–24. As both crank-plates 244—244 mounted on jack-shafts 245—245, Fig. 33, are driven in unison by the belt-members R from shaft 153 located below, a stock-flexing motion is generated by the eccentricity of crank-pins or eccentrics 244, which is transmitted to the stock-flexing rolls O for straightening stock Z as in Figs. 16–24; it being understood that such stock-flexing by rolls O and support 242 is always in cooperative conjunction with at least the equivalent of two series of anvil-rolls I—J and U—V as diagrammatically outlined in Fig. 17 and shown in practical design in Figs. 16 et seq.

In Fig. 34, like Fig. 33, there has been another novelty substitution made for the stock-flexing arbor 229 of Fig. 16, in the form of support 246 for rolls O. This differs from Fig. 33 in that support 246 has its left end 246A mounted pitman-like at one end on the simple adjustable crank-pin or eccentric 243A, upper left Fig. 34; said crank-member 243A being preferably adjustably mounted in the crank-plate (or a crank arm) 244A so that the amount of eccentricity of 243A can be varied to produce the desired amount of stock-flexing by rolls O which are mounted in a "Turk's head" fashion in support 246, Fig. 34. And the opposite end 246B of roll-support 246 in this case extends at right angles and is supported by the sliding shoe-member 247 which idly but rapidly reciprocates horizontally under the crank-like actuation of crank-pin 243A and crank-plate 244A mounted on the jack-shaft 245A and driven from below by belt R and shaft 153, Fig. 34; it being understood that such stock-flexing by rolls O as here disclosed (like in the mechanism of Fig. 33) is always in cooperative conjunction with the equivalent of anvil-rolls I—J and U—V.

In designing complete details for the modifications of Figs. 33 and 34 there may be employed various features of the mechanism of Figs. 16–25, or not, as desired.

Various other combinations within this invention may be employed, such for example as a reversal of the sequence of the two tandem roll-stand "ensembles" of rolls C—CI of Fig. 30; and such as the application of power to the anvil-rolls I—J, U—V of flier D for the feeding of stock Z thru the multi-flexing straightening operation by rolls O; but in the structure of straightening mechanism D of any of the figures including Figs. 33–34 it is preferable to employ the rolls O instead of a series of hardened balls, because if the latter were employed there would be some skidding action between the point contacts of the balls and the continually passing stock which would be liable to undesirably mar the finished surfaces of the rod-like stock undergoing straightening. Also it is desirable to employ rolls instead of balls at I, J and U, V as well as at O for various reasons including longer life of the rolls and more accurate execution of the straightening operations. For in straightening mechanism including balls, minute particles are separated from or off the surfaces of the rod-like stock Z, creating a gritty condition that would soon cause the balls to grind and lose their proper spherical shape necessary for proper execution of the straightening method.

The method of straightening by the whirling element D of the machine involves a definite relation between the thickness, as below, of the rod-like stock on one hand and on the other hand the rate of its longitudinal feed and the rate of its revolution by flexing rollers O in a circle about its longitudinal feed-axis, Fig. 6, and particularly Fig. 17, while other parts of the rod fore and aft of the flexing point at O are held in the longitudinal line of feed by fulcra I, J and U, V. The method also involves definite relations, as below, between the rate of longitudinal feed of the stock and the rate of its circular movement at O, i. e. the stock preferably is revolved laterally about its horizontal feed axis by means of the flexing rollers O, at a rate of about one complete revolution while the stock is being moved longitudinally a distance which is about equal to its diameter or thickness. This I term the "lead", i. e., the length of stock fed longitudinally while the stock is moved laterally one complete revolution. The machine of the invention usually is to be designed for rods of less than one inch diameter or thickness, an average diameter being one-quarter inch, but frequently less and frequently greater than that. The exemplary design of Figs. 1–25 is adapted for rod stock having a range of hexagonal diameters from ⅜ inch to ¾ inch an intermediate diameter being ₁⁵⁄₃₂ inch for which the stock is revolved completely at O once for each feed-distance equal to its diameter in this design and with the disclosed coordinated power transmissions. In such machines designed to handle stock over such a range of diameters as this, the lead for the smallest and largest stock diameters is respectively larger and smaller than the lead for the intermediate diameter of ₁⁵⁄₃₂ inch which is unity. That is, for ⅜ inch stock the lead is of the order of one and one-quarter (i. e., the stock is revolved substantially one and one quarter times for each feed-distance equal to its diameter); and for ¾ inch stock the lead is of the order of three quarters. These leads are established definitely by any given design of flexing-arbor 229 and flexing rolls O, the preferable lead in any case being unity and being so designed for a stock diameter in the middle of the range, but the resulting somewhat different leads for the extreme diameters of the range are practicable altho not optimum, being a sacrifice to the desired provision of diameter-range. In any case, while the stock is being fed continuously in one direction it turns flexing rollers O (and the fulcrum rolls) on their own axes so that the peripheral faces of said rolls travel (without bodily movement of the rolls longitudinally of the stock) relatively longitudinally along the faces or sides of the hexagonal stock disclosed by way of example; all while the set of flexing rolls O, offset from or eccentric to the longitudinal axis of stock feed thru the fulcrum rolls, is being revolved about said stock-feed axis as a center to cause the flexing lateral revolution of the stock between the fulcrum rolls, the set of flexing rolls O being held from rotation about its own center by the engagement of the individual rolls with the polygonal faces of the stock or by the locking device 232 of Figs. 25 and 16. And particularly as to the lead, the peripheries of the flexing rollers O are traveling (relatively) longitudinally along the lateral surface of the stock while the stock is being given its revolution about its axis of feed by the revolution of the rolls O.

In the machine of Figs. 1-25, designed to straighten hexagonal stock over a diameter range from ⅜ inch to ¾ inch, the rate of longitudinal stock-feed may be from 70 feet to 210 feet per minute, the smaller diameters of stock being fed at the higher rates, and the rate being varied by varying the rate of motor P for the different sizes of stock. The R. P. M. of the stock at point O, Fig. 17, may be, for stock of diameters from three-eighths inch to five-eighths or three-quarters inch, from 1350 to 4000, the stock of smaller sizes being revolved at the higher rates; and, as above, the rates of revolution of arbor 229 of Fig. 16 are coordinated with the rates of stock-feed by appropriate designs, as shown and described above, for the transmissions between motor P and the feed-rolls C, C¹, C¹L and flexing arbor 229. The stock, which may be hundreds of feet long, is fed continuously in one direction (and to and thru a shearing machine as disclosed) thru flexing rolls O and there revolved and when it has passed beyond fulcrum rolls U, V beyond flexing rolls O, the stock is in completely straightened condition as the result of the treatment consisting in giving it one complete rotation (as nearly as may be) at O between the sets of fulcrum rolls on opposite sides of O, while a length of stock approximately equal to its diameter is moving from the fulcrum rolls at one side of O to the set on the other side of O. Generally most of the straightening is effected by the spaced rolls C of the rollstand at left, Fig. 1, and only a finishing or refinement of straightening is effected by flexing rolls O, etc., so that their eccentricity due to the eccentric mounting of flexing arbor 229 is not great, say about one-sixth the diameter of the stock, as, say, an eccentricity of 1/16 inch for ⅜ inch stock, and of ⅛ inch for ¾ inch stock. In any case the eccentricity of rolls O relative to the longitudinal axis of stock-feed is very slight, being exaggerated in Figs. 6 and 17 for clearness, and preferably is only a fraction of the diameter of the stock, so that the axis of the stock itself preferably is not moved out of the longitudinal stock path thru the feed-rolls and fulcrum rolls, altho the axis of the stock itself is moved laterally from the axis of stock-feed at the first set of fulcrum-rolls I, J and from the second set U, V. That is, the center of revolution of rolls O by arbor 229 is a shorter distance from the longitudinal axis of stock-feed than the diameter of the stock, in analogy to the eccentric strap for valve-operation in a steam engine.

The sets of rolls I, J, and U, V hold the stock in its longitudinal feed-axis; the first pair of sets of rolls I, J presenting the stock to flexing rolls O at the desired angle in the passage of the stock from the rolls J to the flexing rolls O; and the second pair of sets of rolls U, V hold the stock at the same desired angle between flexing rolls O and rolls U, and in the longitudinal feed axis in line with the feed-rolls which pull the stock from rolls O and thru rolls U, V. Thus the fulcrum-rolls are located longitudinally along the stock in both directions from the flexing rolls O whether or not as preferred and shown, only one set of flexing rolls O is provided. The stock is moved continuously in one direction thru the fulcrum-rolls and flexing rolls while they, the fulcrum-rolls and flexing rolls are operating on it, i. e., the fulcrum-rolls operating to hold it in the line of its longitudinal feed and at the proper angle in its path to the flexing rolls, and the flexing rolls operating to revolve the stock about its feed-axis, the fulcrum-rolls by their distances from (along the stock-axis) the flexing rolls determining the exact nature of the straightening action on the stock. As to such distances there is no exact rule, but the proportions shown are substantially correct and the fulcrum rolls nearer the flexing rolls are distant from the flexing rolls substantially according to the proportions shown for the range of stock-diameters for which the machine of Figs. 1-25 is designed; and the two sets of rolls I, J preferably are fairly close to one another as shown, as are the two sets of rolls U, V. It is preferable to employ both of the two sets of fulcrum-rolls shown at each of the opposite sides of flexing rolls O, for such two sets cooperate in maintaining the desired relations of the stock between the action of flexing rolls O on one hand and the action of the feed rolls on the other hand which feed the stock to and thru rolls I, J, and from rolls U, V.

Ideally, as is practicable in a machine designed to straighten smaller stock exclusively, as ⅜ inch, the eccentric offset for multi-flexing for straightening is twice as great as in a machine designed to straighten thicker stock as ¾ inch.

The provision of two sets of fulcrum rolls at I, J and two sets at U, V confines the stock-flexing by rolls O to portions of the stock existing between rolls J and U at any instant of stock feed; that is, for example at one side of rolls O, while rolls J maintain the general proper slight stock angle between J and O, yet rolls I keep the stock in its feed-axis between J and the feed rolls feeding the stock toward I, J; that is, rolls I prevent bending of the stock (by the action of flexing rolls O) between rolls J and the feeding rolls feeding the stock toward J; and similar action at rolls V prevents bending of the stock beyond rolls U, so that rolls I and V cooperate in limiting stock flexing exclusively between rolls J and U.

What is claimed is:

1. In an apparatus for straightening rod-like metal-stock, the combination with a group of stock-flexing rolls confining laterally the stock moving longitudinally between them, of means revolving said roll-group about the center of the path of the longitudinally moving stock, said means including a hollow driver rotatable about said path-center, hollow supporting means inside the hollow rotatable driver and secured thereto for support and rotation thereby, and a hollow arbor inside said hollow supporting means and journaled therein for support thereby in eccentric relation to the hollow rotatable driver said eccentric relation causing the arbor to be revolved by the driver by way of the supporting means, about the center of the path of the longitudinally moving stock, and said journaled relations of the arbor and supporting means preventing the arbor from being rotated by the driver and supporting means; said flexing-roll group being carried inside said hollow arbor and revolved but not rotated thereby; and said apparatus being formed with a passage for the stock in which the stock is revolved about the center of its longitudinal path by said revolution of the arbor.

2. In an apparatus for straightening rod-like stock, the combination with a group of stock-flexing rolls confining laterally the stock moving longitudinally between them, of supporting means for said roll-group, a rotatable driver having an eccentric connection with said roll-supporting means, and a sliding idler having a pivotal connection with said roll-supporting means.

3. In a straightening machine, apparatus for finish-straightening long rod-like stock moving longitudinally away from the preliminary straightening means after the back of the curve of the stock when coiled has been broken thereby, which includes two circular arrangements of rollers, as fulcrum roller sets, respectively located around the path of longitudinal movement of the long stock, and spaced from one another by a comparatively short distance, the center of said circular arrangements being in alinement with the center of the longitudinal stock-path, a third circular arrangement of rollers as a stock-flexing system, located intermediate said fulcrum roller-sets but supported in positions establishing the center of the flexing-roller system slightly eccentric to the centers of the circular fulcrum-roller sets; all said individual rollers having trunnions supported transversely of the stock-path and adapted for rolling engagement with the longitudinally moving long stock; stationary supporting means for the fulcrum-roller sets; supporting means for the rod-flexing roller-system; and means imparting an exclusively revolutionary movement in small circles to the portion of said supporting means which carries said flexing-roller system, whereby the relatively short portions of the moving long stock progressively moving between the two fulcrum-roller sets is flexed in small circles about the center of its path of longitudinal movement from the preliminary straightening means.

4. In a straightening machine, apparatus for finish-straightening long rod-like stock moving longitudinally away from the preliminary straightening means after the back of the curve of the stock has been broken when coiled, which includes two circularly arranged sets of rollers, as fulcrum-rollers; stationary supporting means in which said sets respectively are located around the path of longitudinal movement of the long stock, and spaced from one another by a comparatively short distance, and with the centers of the sets in line with the center of longitudinal movement of the long stock; a system of stock-flexing rollers; supporting means for said roller-system in which the rollers are mounted in a circle intermediate said fulcrum-roller sets; and means revolving the portion of said supporting means in which said flexing-system is mounted, in small circles, about the center of longitudinal movement of the long stock while the supporting means is held from rotation whereby the flexing roller system itself is given a movement exclusively of revolution and the short portion of the long rod stock between the two sets of fulcrum-rollers is flexed in small circles about its center of longitudinal movement.

5. In a straightening machine, apparatus for finish-straightening long rod-like stock moving longitudinally away from the preliminary straightening means after the back of the curve of the stock has been broken when coiled, which includes a system of flexing-rollers arranged in a circle; four sets of fulcrum-rollers, two on each side of said flexing-roller system in the direction of stock-movement, stationary supporting means for the fulcrum-rollers in which the rollers of the two sets on one side of the flexing-system are displaced from one another, and the rollers of the two sets on the other side of the flexing system likewise are displaced from one another; supporting means for the flexing-roller system; and means revolving the portion of said supporting means in which the flexing-rollers are mounted, in a small circle, about the center of the longitudinal path of the long stock while the supporting means is held from rotation, whereby the flexing-roller system itself is revolved and the short portion of the long stock between the fulcrum rollers on opposite sides of the flexing-system is flexed in small circles about its center of longitudinal movement.

6. In a straightening machine, apparatus for finish-straightening long rod-like stock fed thereto continuously in one direction from the preliminary straightening mechanism, which includes two sets of fulcrum rollers arranged comparatively close together along the path of longitudinal stock-movement, the rollers of each set extending around said path and having trunnions arranged transversely of said path; stationary supporting means for said fulcrum roller sets whereby they hold the moving stock in its path from the preliminary straightening mechanism while the individual rollers are rotated by the moving stock; a system of stock-flexing rollers arranged in a circle between said sets of fulcrum-rollers; supporting means for said flexing-roller system and in which trunnions of the rollers are mounted transversely of the path of the stock moved from the preliminary straightening mechanism; mechanism revolving the portion of said supporting means in which said flexing-rollers are mounted, in relatively very small circles about the center of the path of longitudinal stock-movement while said supporting means is held from rotation and while the individual flexing rollers are being rotated by the stock moving between them, thereby revolving the stock in passage from one of the two sets of fulcrum-rolls to the other, in very small circles about the center of its path of longitudinal movement; said revolving means being coordinated in rate with the rate of the preliminary straightening mechanism which feeds the stock to the flexing system and revolving the latter hundreds of times per minute and once for each very small portion of the length of the stock passing thru the systems of fulcrum and flexing rollers.

JOSEPH H. ROBERTS.